(12) United States Patent
Nakano et al.

(10) Patent No.: US 9,636,693 B2
(45) Date of Patent: May 2, 2017

(54) METHOD AND APPARATUS OF MANUFACTURING EXHAUST GAS-PURIFYING CATALYST AND NOZZLE USED THEREFOR

(71) Applicant: CATALER CORPORATION, Shizuoka (JP)

(72) Inventors: Atsushi Nakano, Shizuoka (JP); Shigeki Mizuno, Shizuoka (JP); Shigeji Matsumoto, Shizuoka (JP); Hiroshi Sekine, Shizuoka (JP); Suguru Matsui, Shizuoka (JP)

(73) Assignee: CATALER CORPORATION, Shizuoka (JP)

( * ) Notice: Subject to any disclaimer, the term of this patent is extended or adjusted under 35 U.S.C. 154(b) by 0 days.

(21) Appl. No.: 14/945,185

(22) Filed: Nov. 18, 2015

(65) Prior Publication Data

US 2016/0067720 A1    Mar. 10, 2016

Related U.S. Application Data

(60) Division of application No. 13/251,761, filed on Oct. 3, 2011, now Pat. No. 9,227,184, which is a
(Continued)

(30) Foreign Application Priority Data

Apr. 3, 2009  (JP) .................................. 2009-091140
Jan. 25, 2010  (JP) .................................. 2010-013568

(51) Int. Cl.
 B05B 1/14 (2006.01)
 B05B 12/02 (2006.01)
(Continued)

(52) U.S. Cl.
 CPC ................. B05B 1/14 (2013.01); B01J 35/04 (2013.01); B01J 37/0215 (2013.01);
(Continued)

(58) Field of Classification Search
 None
 See application file for complete search history.

(56) References Cited

U.S. PATENT DOCUMENTS 4,057,190 A   11/1977  Kiwior et al.
4,544,446 A   10/1985  Cady
(Continued)

FOREIGN PATENT DOCUMENTS

EP    1900442 A1    3/2008
JP    2-40241       2/1990
(Continued)

OTHER PUBLICATIONS

International Search Report mailed by the International Searching Authority (ISA/JP) on Jul. 13, 2010 in connection with PCT International Application No. PCT/JP2010/056098, filed Apr. 2, 2010.
(Continued)

*Primary Examiner* — Dah-Wei D Yuan
*Assistant Examiner* — Jethro M Pence
(74) *Attorney, Agent, or Firm* — John P. White; Cooper & Dunham LLP

(57) ABSTRACT

A nozzle is configured to discharge a fluid containing a raw material of a catalytic layer to a substrate having first and second end faces and provided with holes each extending from the first end face to the second end face. The nozzle is provided with discharge ports each discharging the fluid toward the first end face of the substrate.

14 Claims, 16 Drawing Sheets

Related U.S. Application Data continuation of application No. PCT/JP2010/056098, filed on Apr. 2, 2010.

(51) Int. Cl.
*B05C 5/02* (2006.01)
*B05C 7/02* (2006.01)
*B01J 37/02* (2006.01)
*B01J 35/04* (2006.01)
*B05D 7/22* (2006.01)

(52) U.S. Cl.
CPC ............ *B05B 12/02* (2013.01); *B05C 5/0241* (2013.01); *B05C 7/02* (2013.01); *B05D 7/22* (2013.01)

(56) References Cited

U.S. PATENT DOCUMENTS

| | | | |
|---|---|---|---|
| 4,670,205 | A | 6/1987 | Montierth |
| 4,922,277 | A | 5/1990 | Carlson et al. |
| 9,958,669 | | 9/1990 | Ohta |
| 5,094,278 | A | 3/1992 | Arao et al. |
| 5,489,337 | A | 2/1996 | Nomura et al. |
| 5,688,331 | A | 11/1997 | Aruga et al. |
| 5,891,248 | A * | 4/1999 | Koshiba ............... B23K 1/0014 118/306 |
| 5,909,846 | A | 6/1999 | Sasaki |
| 5,962,070 | A | 10/1999 | Mitsuhashi et al. |
| 6,190,063 | B1 | 2/2001 | Akimoto |
| 6,241,403 | B1 | 6/2001 | Sakamoto et al. |
| 6,402,399 | B2 | 6/2002 | Sakamoto et al. |
| 6,478,874 | B1 | 11/2002 | Rosynsky et al. |
| 6,627,257 | B1 | 9/2003 | Foerster et al. |
| 6,688,784 | B1 | 2/2004 | Templeton |
| 6,830,389 | B2 | 12/2004 | Templeton |
| 6,968,867 | B2 | 11/2005 | Jenkins |
| 7,503,957 | B2 | 3/2009 | Ichikawa |
| 7,594,616 | B2 | 9/2009 | Hupp |
| 2002/0042344 | A1 | 4/2002 | Kondo et al. |
| 2003/0003232 | A1 | 1/2003 | Rosynsky et al. |
| 2003/0140608 | A1 | 7/2003 | Hamanaka et al. |
| 2006/0237563 | A1 | 10/2006 | Hupp |
| 2008/0118628 | A1 | 5/2008 | Harris et al. |
| 2009/0136710 | A1 | 5/2009 | Ichikawa |
| 2009/0155475 | A1 | 6/2009 | Goshima et al. |
| 2009/0169744 | A1 | 7/2009 | Byun et al. |
| 2010/0093527 | A1 | 4/2010 | Hasselmann |
| 2012/0021896 | A1 | 1/2012 | Nakano et al. |

FOREIGN PATENT DOCUMENTS

| | | | |
|---|---|---|---|
| JP | 02-40241 | A | 2/1990 |
| JP | 2000-190312 | A | 7/2000 |
| JP | 2002-28499 | A | 1/2002 |
| JP | 2002-136816 | A | 5/2002 |
| JP | 2004-174366 | A | 6/2004 |
| JP | 2007-330879 | A | 12/2007 |
| WO | WO 2006/112907 | A1 | 10/2006 |
| WO | WO 2007/007370 | A1 | 1/2007 |
| WO | WO 2008/113801 | A1 | 9/2008 |

OTHER PUBLICATIONS

Written Opinion of the International Searching Authority mailed by the International Searching Authority (ISA/JP) on Jul. 13, 2010 in connection with PCT International Application No. PCT/JP2010/056098, filed Apr. 2, 2010.
English translation of the International Preliminary Report on Patentability issued Nov. 24, 2011 in connection with PCT/JP2010/056098 filed on Apr. 2, 2010.
Written Opinion of the International Searching Authority issued Jul. 13, 2010 in connection with PCT/JP2010/056098, filed on Apr. 2, 2010.
Office Action issued Dec. 4, 2012 in connection with U.S. Appl. No. 13/251,761, filed Oct. 3, 2011.
Response to Dec. 4, 2012 Office Action, filed Dec. 21, 2012, in connection with U.S. Appl. No. 13/251,761, filed Oct. 3, 2011.
Office Action issued Jan. 31, 2013 in connection with U.S. Appl. No. 13/251,761, filed Oct. 3, 2011.
Response to Jan. 31, 2013 Office Action, filed Jul. 31, 2013, in connection with U.S. Appl. No. 13/251,761, filed Oct. 3, 2011.
Final Office Action issued Nov. 20, 2013 in connection with U.S. Appl. No. 13/251,761, filed Oct. 3, 2011.
Response to Nov. 20, 2013 Final Office Action, filed Mar. 20, 2014, in connection with U.S. Appl. No. 13/251,761, filed Oct. 3, 2011.
Office Action issued May 6, 2014 in connection with U.S. Appl. No. 13/251,761, filed Oct. 3, 2011.
Response to May 6, 2014 Office Action, filed Oct. 30, 2014, in connection with U.S. Appl. No. 13/251,761, filed Oct. 3, 2011.
Final Office Action issued Feb. 5, 2015 in connection with U.S. Appl. No. 13/251,761, filed Oct. 3, 2011.
Response to Feb. 5, 2015 Final Office Action, filed Jul. 2, 2015, in connection with U.S. Appl. No. 13/251,761, filed Oct. 3, 2011.
Notice of Allowance issued Sep. 11, 2015 in connection with U.S. Appl. No. 11/114,962, filed Apr. 26, 2005.
European Search Report mailed Jan. 5, 2017 in connection with European Patent Application No. 10758899.8.

* cited by examiner

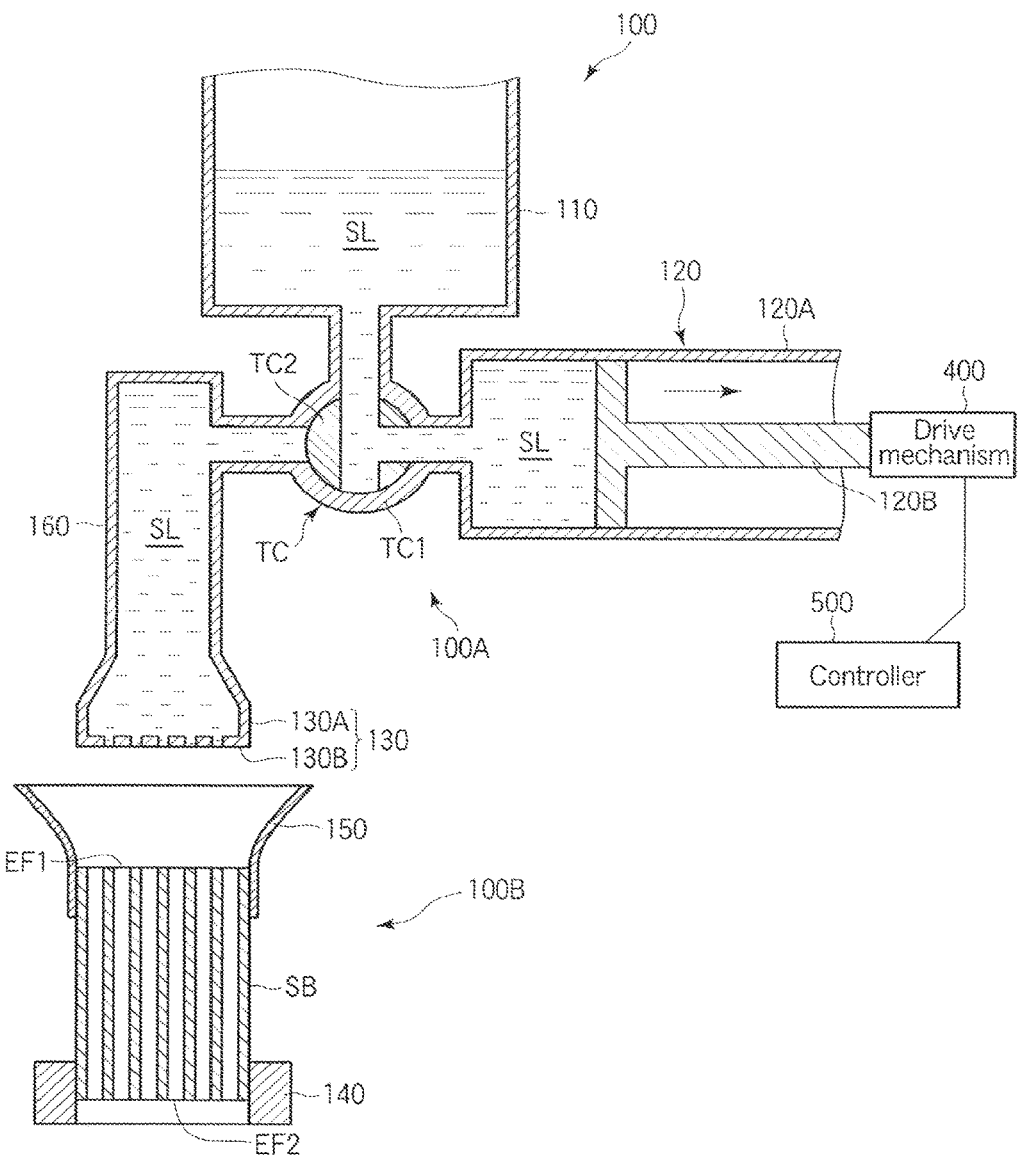
F I G. 1

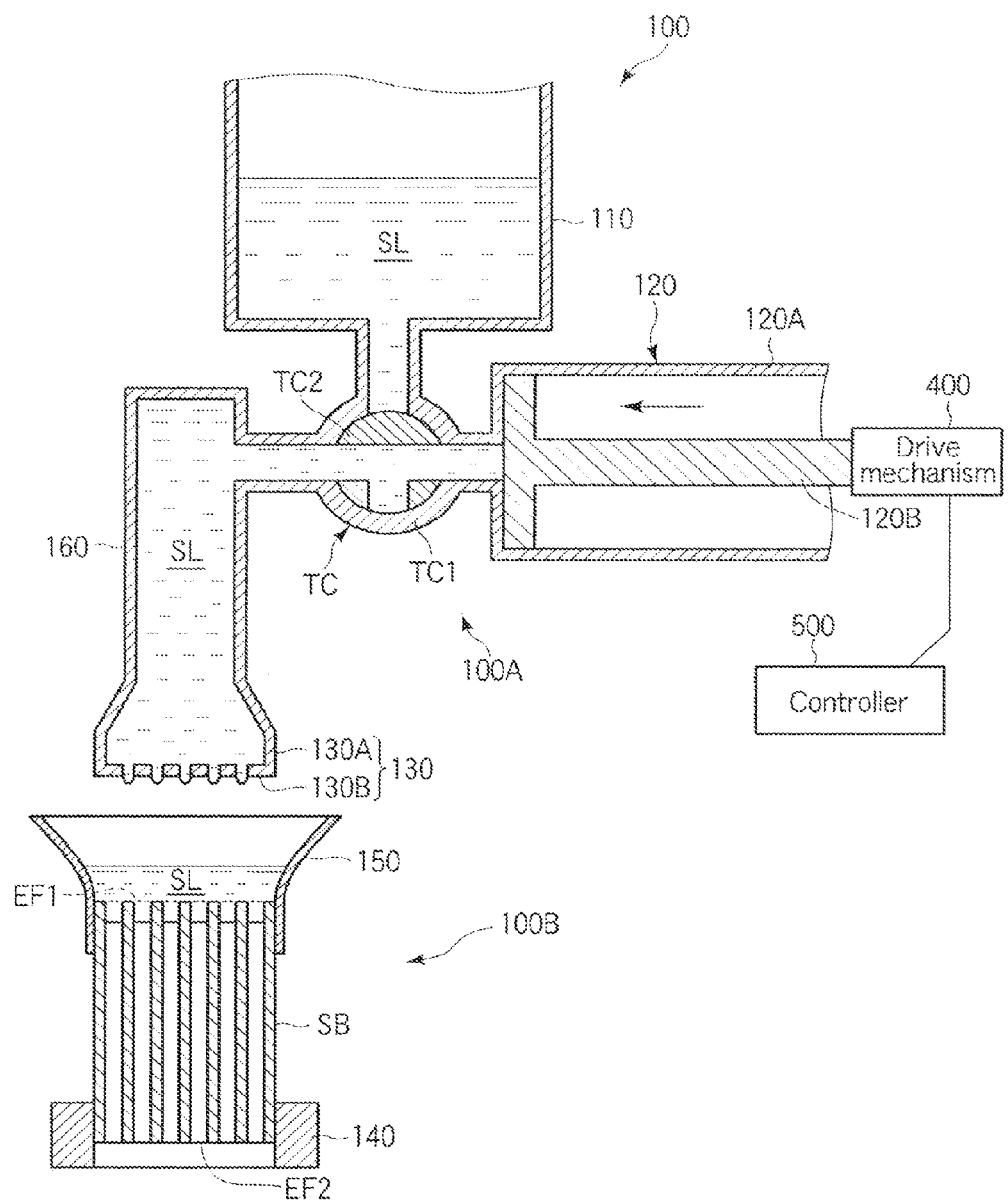
F I G. 3

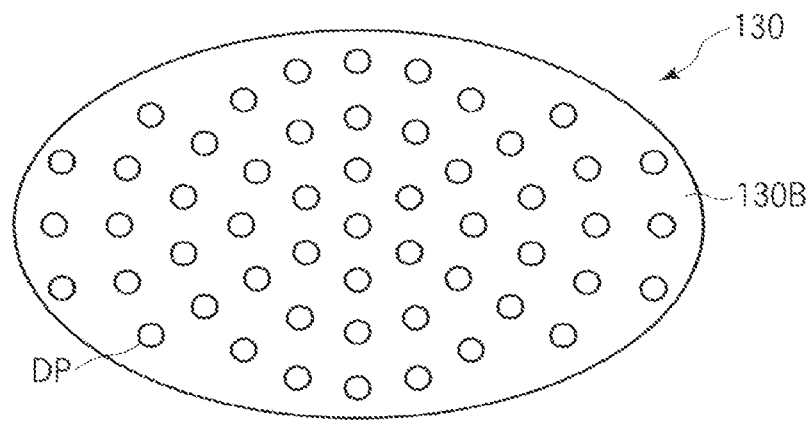
F I G. 9
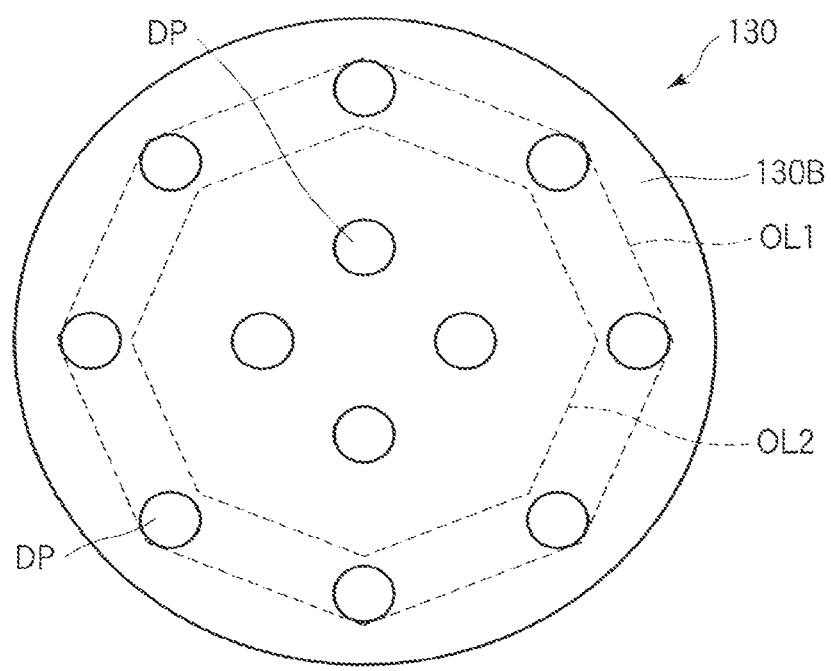
F I G. 10

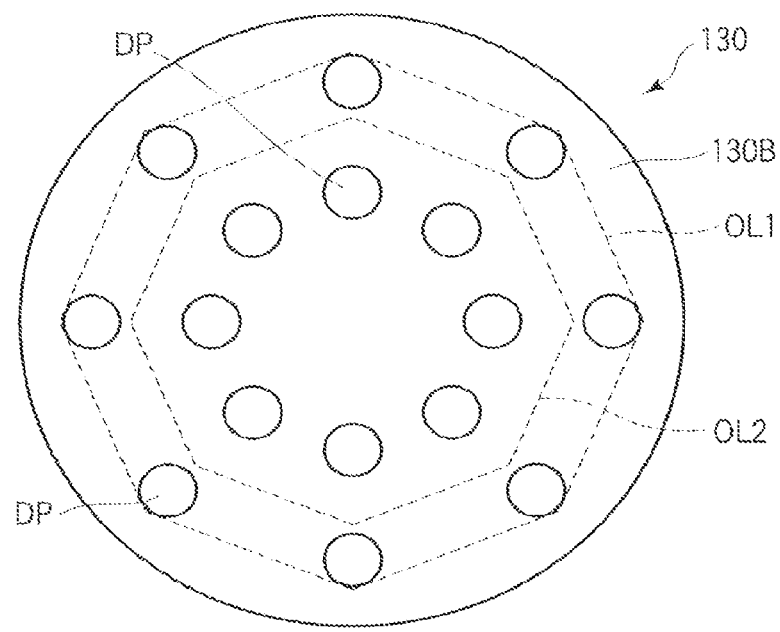
F I G. 11
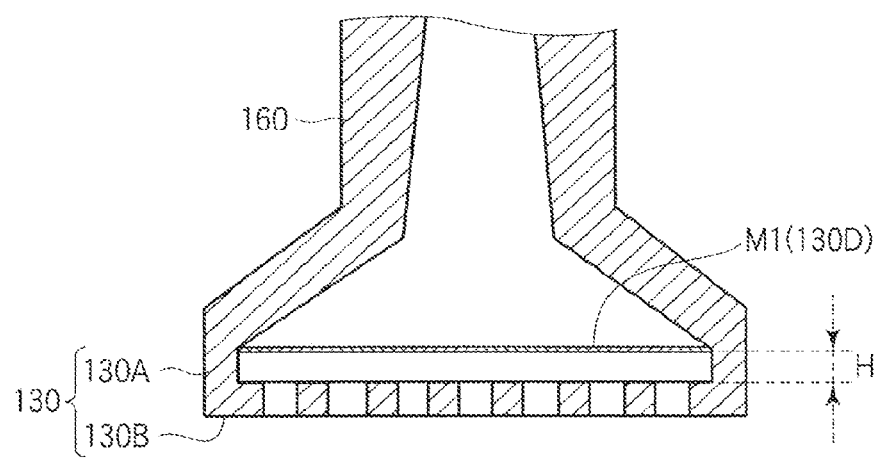
F I G. 12

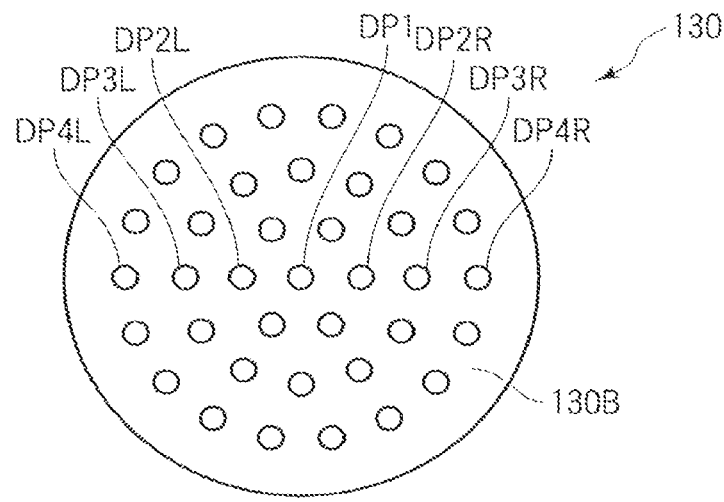
F I G. 23
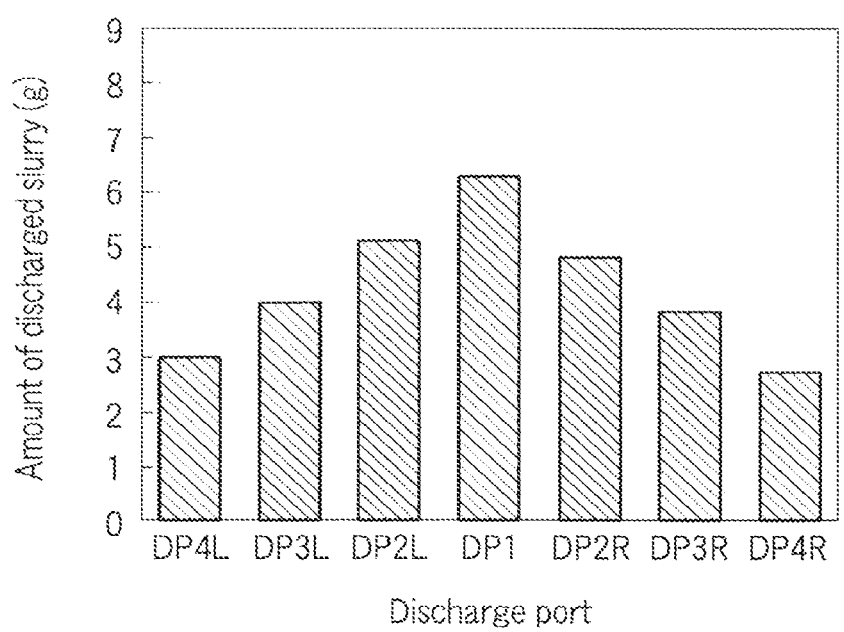
F I G. 24

METHOD AND APPARATUS OF MANUFACTURING EXHAUST GAS-PURIFYING CATALYST AND NOZZLE USED THEREFOR

RELATED APPLICATIONS

This application is a divisional of U.S. Ser. No. 13/251,761, filed Oct. 3, 2011, which is a continuation of PCT International Application No. PCT/JP2010/056098, filed Apr. 2, 2010, which claims the priority of Japanese Patent Application Nos. 2010-013568, filed Jan. 25, 2010 and 2009-091140, filed Apr. 3, 2009, the contents of each of which are hereby incorporated by reference in their entirety into this application.

CROSS-REFERENCE TO RELATED APPLICATIONS

This application is a Continuation application of PCT Application No. PCT/JP2010/056098, filed Apr. 2, 2010 and based upon and claiming the benefit of priority from prior Japanese Patent Applications No. 2009-091140, filed Apr. 3, 2009; and No. 2010-013568, filed Jan. 25, 2010, the entire contents of all of which are incorporated herein by reference.

BACKGROUND OF THE INVENTION

1. Field of the Invention

The present invention relates to a technique of manufacturing an exhaust gas-purifying catalyst.

2. Description of the Related Art

An exhaust gas-purifying catalyst includes, for example, a monolith substrate having through-holes therein and a catalytic layer formed on the monolith substrate. Such an exhaust gas-purifying catalyst can be obtained by, for example, coating the monolith substrate with slurry containing a raw material of the catalytic layer and subsequently subjecting the coated layer to drying and firing treatments.

In recent years, used widely are exhaust gas-purifying catalysts in which two catalytic layers having different compositions are formed on upstream and downstream sections of the monolith substrate. An example of such exhaust gas-purifying catalysts is described in Jpn. Pat. Appln. KOKAI Publication No. 2007-330879. When manufacturing this type of exhaust gas-purifying catalysts, two areas of the substrate are coated with different slurries each containing either of the raw materials of the catalytic layers.

BRIEF SUMMARY OF THE INVENTION

In the above-described exhaust gas-purifying catalyst, the catalytic layers adjacent to each other are desirably arranged to have a small distance therebetween. This is because that a smaller distance is advantageous in enhancing its ability to purify an exhaust gas per a unit volumetric capacity of the substrate.

In the conventional methods of manufacturing exhaust gas-purifying catalysts, a relatively great variation is prone to occur in the positions of the edges of the catalytic layers. When the edge positions of the catalytic layers vary, the catalytic layers may partially overlap one another. The portions of the catalytic layers overlap one another may cause a pressure loss. That is, in this case, there is a possibility that it will be difficult to exploit the full potential of the exhaust gas-purifying catalyst.

An object of the present invention is to provide a technique that makes it possible to manufacture an exhaust gas-purifying catalyst offering a superior performance.

According to a first aspect of the present invention, there is provided a nozzle configured to discharge a fluid containing a raw material of a catalytic layer to a substrate, the substrate having first and second end faces and being provided with holes each extending from the first end face toward the second end face, the nozzle being provided with discharge ports each discharging the fluid toward the first end face of the substrate.

According to a second aspect of the present invention, there is provided an apparatus of manufacturing an exhaust gas-purifying catalyst, comprising a support supporting the substrate, and the nozzle according to the first aspect.

According to a third aspect of the present invention, there is provided a method of manufacturing an exhaust gas-purifying catalyst, comprising supplying the fluid to the substrate using the nozzle according to the first aspect.

BRIEF DESCRIPTION OF THE SEVERAL VIEWS OF THE DRAWING

FIG. 1 is a sectional view schematically showing an apparatus of manufacturing an exhaust gas-purifying catalyst according to an embodiment of the present invention in a state of performing a preparatory operation;

FIG. 3 is a sectional view schematically showing the manufacturing apparatus shown in FIG. 1 a state that the fluid supply operation is completed;

FIG. 9 is a plan view schematically showing a modified example of the nozzle;

FIG. 10 is a plan view schematically showing another modified example of the nozzle;

FIG. 11 is a plan view schematically showing another modified example of the nozzle;

FIG. 12 is a plan view schematically showing another modified example of the nozzle;

FIG. 23 is a plan view schematically showing the nozzle used in Example 3;

FIG. 24 is a bar graph showing an example of a relationship between the position of the discharge port and the amount of the discharged slurry;

DETAILED DESCRIPTION OF THE INVENTION

Figure 2:
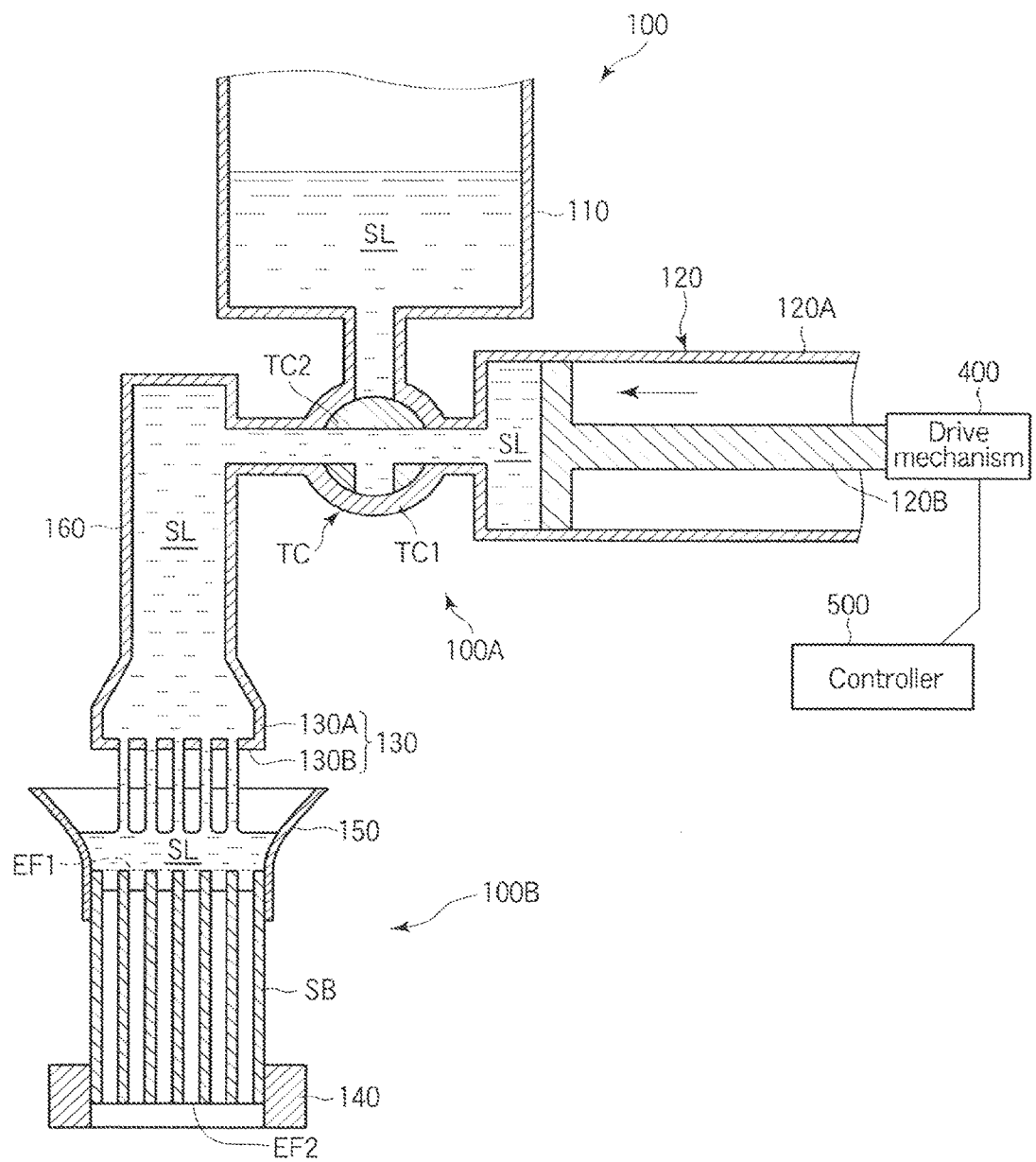
FIG. 2 is a sectional view schematically showing the manufacturing apparatus shown in FIG. 1 in a state of performing a fluid supply operation.

Embodiments of the present invention will be described below with reference to the accompanying drawings. Note that the same reference numerals in the drawings denote components that achieve the same or similar functions, and a repetitive explanation thereof will be omitted.

Figure 4:
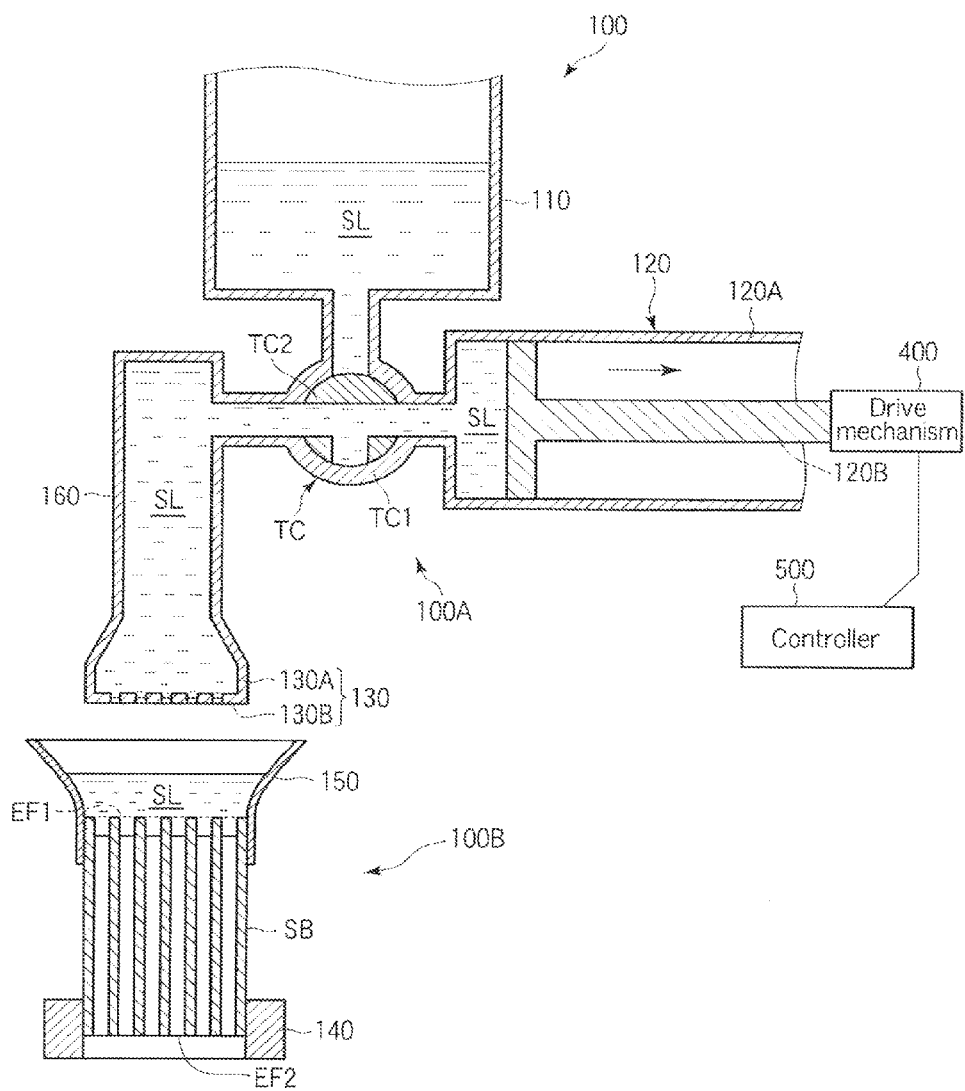
FIG. 4 is a sectional view schematically showing the manufacturing apparatus shown in FIG. 1 a state of performing a suction operation.

FIG. 1 is a sectional view schematically showing an apparatus of manufacturing an exhaust gas-purifying catalyst according to an embodiment of the present invention in a state of performing a preparatory operation. FIG. 2 is a sectional view schematically showing the manufacturing apparatus shown in FIG. 1 in a state of performing a fluid supply operation. FIG. 3 is a sectional view schematically showing the manufacturing apparatus shown in FIG. 1 in a state that the fluid supply operation is completed. FIG. 4 is a sectional view schematically showing the manufacturing apparatus shown in FIG. 1 in a state of performing a suction operation.

The manufacturing apparatus 100 shown in FIGS. 1 to 4 supplies a substrate SB with a slurry SL containing a raw material of a catalytic layer.

The substrate SB has a first end face EF1 and a second end face EF2. The substrate SB is provided with holes each extending from the first end face EF1 toward the second end face EF2. The substrate SB is, for example, a monolith honeycomb substrate used in a straight-flow-type exhaust gas-purifying catalyst. The substrate SB may be a monolith honeycomb substrate used in a wall-flow-type exhaust gas-purifying catalyst.

The manufacturing apparatus 100 includes a first portion 100A and a second portion 100B. The first portion 100A plays a role of supplying the fluid SL to the end face EF1 of the substrate SB. The second portion plays a role of assisting in supplying the fluid SL to the end face EF1 of the substrate SB.

The first portion includes a fluid supply device, a nozzle 130, and a conduit 160. The fluid supply device includes a tank 110, a switch device, a syringe 120, a second drive mechanism 400, and a controller 500.

The tank 110 stores the fluid SL. The fluid SL contains a raw material of a catalytic layer such as catalytic metal. Typically, the fluid SL is slurry containing the above-described raw material.

The tank 110 is provided with an outlet. The fluid SL in the tank 110 is discharged through the outlet to the outside of the tank 110.

The switch device includes a valve TC and a first drive mechanism (not shown).

The valve TC includes a support member TC1 and a plug TC2.

The support member TC1 is a hollow body. The support member TC1 is provided with three ports. One of the ports is communicated with the outlet of the tank 110.

The plug TC2 is rotatably fit in the support member TC1 having a hollow structure. The plug TC2 is provided with a channel that is trifurcated correspondingly to the arrangement of the ports of the support member TC1.

The first drive mechanism is connected to the valve TC1. The first drive mechanism rotates the plug TC2 and makes it possible to switch the connection between the ports by adjusting the position of the channel in the plug TC2 with respect to the positions of the ports of the support member TC1. This operation of the first drive mechanism will be described later in more detail.

The syringe 120 includes a cylinder 120A and a piston 120B linearly movable therein. The cylinder 120A is connected to one of the ports of the support member TC1.

The second drive mechanism 400 is connected to the piston 120B. The second drive mechanism 400 causes the piston 120B to linearly move in and relative to the cylinder 120A. This operation of the second drive mechanism 400 will be described later in more detail.

The controller 500 is connected to the first drive mechanism, the second drive mechanism 400, and suck and transportation devices described later. The controller 500 controls operation of the first and second drive mechanisms and operation of the suck and transportation devices. The control executed by the controller 500 will be described later in more detail.

The conduit 160 includes first and second end portions. The first end portion is connected to one of the ports of the support member TC1. The fluid from the fluid supply device is supplied to first end portion.

The nozzle 130 includes a hollow portion 130A and a plate-like portion 130B.

The hollow portion 130A is a hollow body. The hollow portion 130A defines an internal space therein. The hollow portion 130A is provided with first and second openings connecting the internal space and an external space outside the hollow portion 130A with each other. Typically, the diameter of the internal space of the hollow portion 130A increases from the first opening toward the second opening. The first opening is connected to the second end portion of the conduit 160.

The plate-like portion 130B covers the second opening. The plate-like portion 130B is provided with discharge ports that discharge the fluid SL supplied to the internal space of the hollow portion 130A toward the end face EF1 of the substrate SB. Although drawn in FIGS. 1 to 4 is the plate-like portion 130B having a shape of a flat plate, the plate-like portion 130B may have a shape different from a shape of a flat plate. For example, one of the main surfaces of the plate-like portion 130B may protrude partially.

Figure 5:
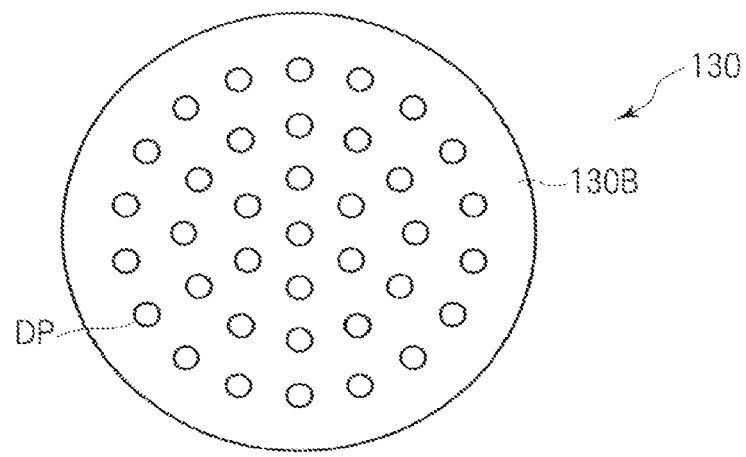
FIG. 5 is a plan view schematically showing the nozzle included in the manufacturing apparatus shown in FIGS. 1 to 4.

FIG. 5 is a plan view schematically showing the nozzle included in the manufacturing apparatus shown in FIGS. 1 to 4. The plate-like portion 130B of this nozzle 130 has a circular shape. The plate-like portion 130B is provided with discharge ports DP each having a circular shape. The discharge ports DP are distributed evenly.

Note that the combination of the syringe 120 and the valve TC shown in FIGS. 1 to 4 is used to take a predetermined amount of the fluid SL. A gear pump, etc. may be used instead of the syringe 120 and the valve TC.

The second portion 100B includes a support 140 and a guide member 150 shown in FIGS. 1 to 4 and suction and transportation devices (not shown).

The support 140 supports the substrate SB such that the end face EF1 of the substrate SB faces the discharge ports of the nozzle 130.

The guide member 150 has a shape of a frame. The guide member 150 is placed such that the guide member 150 surrounds a region adjacent to the substrate SB at a position of the end face EF1 of the substrate SB. The guide member 150 and the end face EF1 of the substrate 1 serve as a receiving pan or fluid reservoir that receives the fluid SL. The guide member 150 prevents the fluid SL from running down the outer face of the substrate SB and makes the height of the surface of the fluid supplied to the end face EF1 more uniform.

Typically, the guide member 150 is placed at the above-described position on the substrate SB by an installation mechanism (not shown). Alternatively, the guide member 150 may be placed at the above-described position on the substrate SB by hand operation.

The suction device sucks down the fluid, typically gas, in the holes of the substrate SB from the end face EF2 of the substrate SB supported by the support 140. In the case where the fluid SL has a low viscosity, the suction device may be omitted.

The transportation device transfers the substrate SB to which the fluid SL is not supplied yet such that its end face EF1 is positioned in front of the plate-like portion 130B. Further, the transportation device transfers the substrate SB having been supplied with the fluid SL from the position in front of the plate-like portion 130B to another position.

The transportation device may further include a transfer mechanism that transfers the support 140 and/or the guide member 150 in addition to the transportation mechanism that transports the substrate SB. The transfer mechanism may be the one that relatively transfers, for example, the support 140 and the guide member 150 with respect to each other in the flow direction of the fluid SL discharged by the nozzle 130. Alternatively, the transfer mechanism may be the one that transfers at least one of the support 140 and the guide member 150 between the position in front of the plate-like portion 130B and another position. Alternatively, the transfer mechanism may be the one that performs both of them.

The fluid supply device of the manufacturing apparatus 100 supplies the fluid SL to the end face EF1 of the substrate SB in the following manner. Note that in the following description, one of the three ports of the support member TC1 connected to the tank 110 is referred to as a first port, another of the ports connected to the syringe 120 is referred to as a second port, and the remainder of the ports connected to the conduit 160 is referred to as a third port.

In the case where the operation of the manufacturing apparatus 100 is suspended for a long period of time, the internal spaces of the tank 110, syringe 120, valve TC, conduit 160 and nozzle 130 are normally emptied. Further, when the manufacturing apparatus 100 is operated for the first time, the internal spaces are empty in ordinary cases.

In the case of starting the operation of the apparatus 100 in such a condition, firstly, the tank 110 is supplied with the fluid SL. At this moment, the piston 120B is positioned such that its front end is in contact with the bottom of the cylinder 120A.

Next, the channel of the plug TC2 is aligned with respect to the first to third ports such that of the first to third ports of the support member TC1, only the first and second ports are communicated with each other. In this state, the piston 120B is linearly moved such that its front end moves away from the bottom of the cylinder 120A so as to supply the fluid SL in the tan 110 into the syringe 120 through the valve TC.

Then, the plug TC2 is rotated such that of the first to third ports of the support member TC1, only the second and third ports are communicated with each other. Subsequently, the piston 120B is linearly moved at a relatively high speed such that its front end moves closer to the bottom of the cylinder 120A so as to supply the fluid SL in the syringe 120 to the conduit 160 through the valve TC.

Further, the sequence of supplying the fluid SL in the tank 110 into the syringe 120 and supplying the fluid SL in the syringe 120 into the conduit 160 is repeated, if necessary. Thus, almost the entire internal spaces of the conduit 160 and the nozzle 130 are filled with the fluid SL.

Note that the fluid SL is discharged from the nozzle 130 until filling of the internal spaces with the fluid SL is completed. The fluid SL discharged at this time is discarded or sent back into the tank 110.

This start-up operation or a part thereof may be performed manually or automated. In the case where the start-up operation or a part thereof is automated, the controller 500 controls, for example, the operation of the first drive mechanism to rotate the plug TC2 and the operation of the second drive mechanism 400 to linearly move the piston 120B.

After the start-up operation is completed, the first to fourth operations described below are performed in this order.

In the first operation, the controller 500 causes the transportation device to be operated as follows. That is, the substrate SB to which the fluid is not supplied yet is transferred to a position in front of the plate-like portion 130B such that the end face EF1 faces the plate-like portion 130B. At this position, the substrate SB is supported by the support 140 and the guide member 150 is attached to the end portion of the substrate SB having the end face EF1.

The substrate may be supported by the support 140 before transferring it to the position in front of the plate-like portion 130B. Similarly, the guide member 150 may be attached to the end portion of the substrate SB having the end face EF1 before transferring it to the position in front of the plate-like portion 130B.

Then the controller 500 causes the fluid supply device to be operated as shown in FIG. 1. Specifically, the controller 500 controls the operation of the first drive mechanism of the switch device to set the connection of the first to third ports to a state in which the first and second ports are connected with each other and the third port is disconnected from the first and second ports (hereinafter this state is referred to as a first state). Subsequently, the controller 500 controls the operation of the second drive mechanism 400 to linearly move the piston 120B relative to the cylinder 120A such that its front end moves away from the bottom of the cylinder 120A. By these operations, a predetermined amount of fluid SL in the tank 110 is introduced into the syringe 120.

In the second operation, the controller 500 causes the fluid supply device to be operated as shown in FIGS. 2 and 3. Specifically, the controller 500 firstly controls the operation of the first drive mechanism of the switch device to set the connection of the first to third ports to a state in which the second and third ports are connected with each other and the first port is disconnected from the second and third ports (hereinafter this state is referred to as a second state). Subsequently, the controller 500 controls the operation of the second drive mechanism 400 to linearly move the piston 120B relative to the cylinder 120A such that its front end moves closer to the bottom of the cylinder 120A. By these operations, a constant amount of fluid SL is supplied from the syringe 120 into the conduit 160.

When the conduit 160 is supplied with the fluid SL, the fluid SL in the nozzle 130 is pushed out of the nozzle 130 through the discharge ports DP. Thus, the nozzle 130 discharges the fluid SL toward the end face EF1 of the substrate SB.

The controller 500 also controls the operation of the suction device in addition to the above-described operation of the fluid supply device as follows. That is, the controller 500 causes the suction device to suck the fluid in the holes of the substrate SB, for example, air from the end face EF2 of the substrate SB that is supported by the support 140 at the moment when the nozzle 130 starts to discharge the fluid SL, after the nozzle 130 starts to discharge the fluid SL and before completing the discharge, or after the nozzle 130 completes the discharge of the fluid SL.

This suction accelerates the movement of the fluid SL from the end face EF1 toward the end face EF2. On the portion of the partition wall of the substrate SB where the fluid SB has passed through, a coated layer of the fluid SL (hereinafter referred to as a fluid layer) is formed. Here, it is supposed that the fluid layer is formed only in the region sandwiched by the end face EF1 and a plane that is parallel with the end face EF1 and is positioned between and spaced apart from the end faces EF1 and EF2.

The fluid layer can be formed in the above region by adjusting the amount of the fluid SL that moves away from the end face EF1. The amount of the fluid SL that moves away from the end face EF1 or the position of the edge of the fluid layer near the end face EF2 (hereinafter referred to as a front edge) can be controlled by, for example, amount and viscosity of the fluid SL and suction force and time.

In the third operation, the controller 500 causes the fluid supply device to be operated as shown in FIG. 4. Specifically, the controller 500 controls the operation of the second drive mechanism 400 to linearly move the piston 120B relative to the cylinder 120A such that its front end moves away from the bottom of the cylinder 120A. Thus, the fluid SL hanging down from or positioned in the discharge ports DP is sucked back into the nozzle 130, thereby preventing the fluid SL from dripping down from the nozzle 130.

Note that since this operation is aimed at preventing fluid SL from dripping down, it suffices that the travel amount of the piston 120B with respect to the cylinder 120A is very small. For example, the piston 120B may be linearly moved with respect to the cylinder 120A such that the level of the fluid SL at the front end of the nozzle 130 becomes almost flush with the main surface of the plate-like portion 130B facing the end face EF1 or the other main surface of the plate-like portion 130B adjacent to the internal space of the nozzle 130, or alternatively, that the level of the fluid SL at the front end of the nozzle 130 moves to the position between the main surfaces of the plate-like portion 130B.

In the fourth operation, the controller 500 causes the transportation device to be operated as follows. That is, the guide member 150 is removed from the substrate SB having the fluid layer formed on its partition wall. Then, the substrate SB is removed from the support 140. Thereafter, the substrate SB is transferred from the position in front of the plate-like portion 130B to another position.

The guide member 150 may be removed from the substrate SB after transferring the substrate from the position in front of the plate-like portion 130B to another position. Similarly, the substrate SB may be removed from the support 140 after transferring the substrate from the position in front of the plate-like portion 130B to another position.

Thus, obtained is the substrate having the fluid layer formed on the partition wall. Note that in the case of a continuous production, the sequence of the first to fourth operations is repeated.

This manufacturing apparatus 100 supplies the fluid SL containing the raw material of a catalytic layer to the end face EF1 of the substrate SB. The fluid SL discharged from the nozzle 130 forms a layer on the end face EF1 of the substrate SB. When sucking the gas in the through-holes of the substrate SB from the end face EF2, the fluid SL forms the fluid layer on the sidewalls of the through-holes. Subjecting the fluid layer to dry and firing treatments obtains the catalytic layer.

The manufacturing apparatus 100 supplies the fluid SL containing the raw material of a catalytic layer to the end face EF1 of the substrate SB not through a single discharge port but through a plurality of discharge ports DP. In this case, the fluid SL discharged from the nozzle 130 forms a layer having a comparatively uniform thickness on the end face EF1 of the substrate SB. Thus, the holes of the substrate SB are supplied with almost the same amount of the fluid SL, and the fluid layer can be obtained to have a small variation in the position of the front edge. That is, a catalytic layer having a small variation in the position of the front edge can be obtained.

The effects achieved using this nozzle 130 will be described below in more detail.

Figure 6:
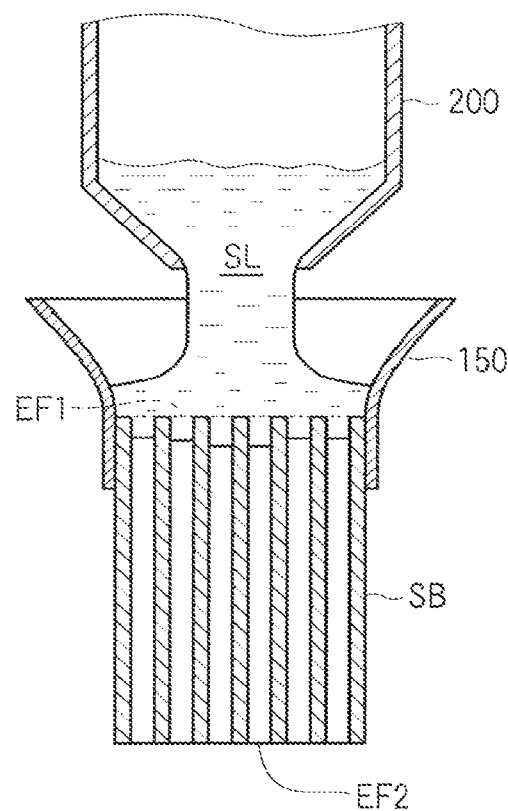
FIG. 6 is a sectional view showing a step of a method of forming a catalytic layer according to a comparative example.
Figure 7:
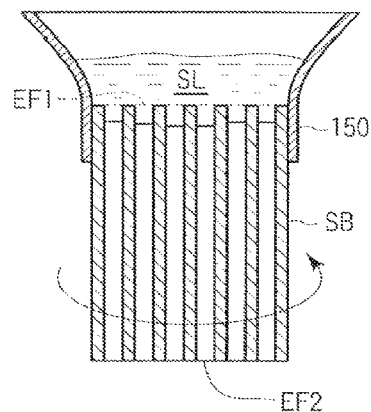
FIG. 7 is a sectional view showing another step of the method of forming a catalytic layer according to the comparative example.

FIG. 6 is a sectional view showing a step of a method of forming a catalytic layer according to a comparative example. FIG. 7 is a sectional view showing another step of the method of forming a catalytic layer according to the comparative example.

In the method according to this comparative example, the fluid SL is firstly supplied to the end face EF1 of the substrate SB using the nozzle 200 that has a single discharge port as shown in FIG. 6. Typically, the guide member 150 is placed at this moment on the substrate SB at the position of the end face EF1.

In the case of employing such a system, the amount of the fluid SL supplied to the end face EF1 of the substrate SB varies in the in-plane direction. Specifically, the area directly below the discharge port is supplied with a comparatively large amount of the fluid SL, while the other area is supplied with a comparatively small amount of the fluid SL. When the above-described suction treatment is performed in this state, the position of the front edge of the fluid layer greatly varies. Thus, a catalytic layer thus obtained will have a great variation in the position of the front edge.

For this reason, in the method according to this comparative example, a leveling treatment including rotating the substrate SB is typically performed after the fluid SL is supplied from the nozzle 200 as shown in FIG. 7. Specifically, the substrate SB is span about the rotation axis that is parallel with the length direction of the holes of the substrate SB. By the action of the centrifugal force caused by the spinning, the layer of the fluid SL on the end face EF1 of the substrate SB can have a relatively uniform thickness. Thus, when the above-described suction treatment is performed in this state, a catalytic layer thus obtained will have a relatively small variation in the position of the front edge.

The method according to this comparative example, however, has following problems. Firstly, a spinning mechanism for performing the above-described spinning is necessary in order to manufacture an exhaust gas-purifying catalyst. Thus, the manufacturing apparatus employing this method is relatively expensive and requires many steps for its maintenance. This makes initial and maintenance costs high. Therefore, in the case of employing this method, achieving a high cost competitiveness is difficult.

Further, in the case where the shape of the substrate SB is not a circular cylinder, it is difficult to form the layer of the fluid SL on the end face EF1 of the substrate SB to have a uniform thickness by the leveling treatment that utilizes spinning. For example, in the case where the shape of the substrate SB is an elliptic cylinder, when the substrate SB is spun about the axis that passes through the center of the end face EF1 and is perpendicular to the end face EF1, the layer of the fluid SL formed on the end face EF1 will have a thickness greater at the ends of the major axis than at the end of the minor axis. Thus, in this case, even when the leveling treatment that utilizes spinning is performed, the thickness of the layer of the fluid SL formed on the end face EF1 will vary. Therefore, in this case, it is difficult to minimize the variation in the position of the front edge of the fluid layer.

In addition, in the case where the end face EF1 of the substrate SB is large, there is a possibility that the fluid SL does not reach the peripheral area of the end face even when the leveling treatment that utilizes spinning is performed. In this case, a comparatively large amount of the fluid SL will remain at the central area of the end face EF1, while a relatively small amount of the fluid SL will be supplied to the peripheral area. Thus, in this case, it is also difficult to minimize the variation in the position of the front edge of the fluid layer.

By contrast, the manufacturing apparatus 100 described with reference to FIGS. 1 to 5 supplies the fluid SL to the end face EF1 of the substrate SB using the nozzle having a plurality of discharge ports DP. Thus, in this case, the layer of the fluid SL formed on the end face EF1 of the substrate SB, that is, the layer of the fluid SL formed on the end face EF1 of the substrate SB shown in FIG. 4 has a more uniform thickness as compared with the case of using the nozzle 200 that has a single discharge port. Thus, even when the leveling treatment that utilizes spinning is omitted, the variation in the position of the front edge of the fluid layer can be minimized. Therefore, an exhaust gas-purifying catalyst offering a superior performance can be manufactured more easily.

Further, the third operation is performed in the above process. When the third operation is performed, it is possible to prevent the fluid SL from dripping down from the discharge ports over a period of time during which the fluid SL is not supplied. Therefore, it is possible to minimize the variation between the substrates SB in the amount of the fluid SL supplied to the end face EF1.

In addition, the third operation does not require a complicated structure or mechanism. In other words, in the case of performing the third operation, it is not necessary to further install members for preventing the dripping of the fluid SL, for example, a combination of the liquid amount-adjusting member and the rotary actuator described later in the manufacturing apparatus 100. Therefore, in this case, it is possible to reduce the manufacturing cost of the manufacturing apparatus 100 and make the maintenance of the apparatus easier.

In the case of introducing a complicated structure or mechanism, there is a possibility that the flexibility in design for the manufacturing apparatus 100 is limited. For example, in the case of using the combination of the liquid amount-adjusting member and the rotary actuator described later instead of performing the third operation in order to prevent the dripping of the fluid SL, it is difficult to provide a discharge port at the center of the plate-like portion 130B of the nozzle 130. Therefore, in this case, there is a possibility that the amount of the fluid discharged from the center and its vicinity of the plate-like portion 130B is comparatively small, and the distribution of the amount of the fluid SL is comparatively nonuniform on a plane parallel with the end face EF1 of the substrate SB. By contrast, in the case of performing the third operation, the arrangement of the discharge ports DP can be determined freely. Therefore, in the case of performing the third operation, implementation of the design is easier as compared with the case of using the combination of the liquid amount-adjusting member and the rotary actuator.

Various modifications can be made to the manufacturing apparatus 100 and the process described with reference to FIGS. 1 to 5.

The third operation may be performed prior to the fourth operation as described above or may be performed after the fourth operation. Alternatively, the third and fourth operations may be performed simultaneously.

Alternatively, it is possible that a sequence including the first, second and fourth operations is repeated during the continuous production, and the third operation is performed only when the continuous production is suspended. This makes it possible to prevent the dripping of the fluid SL without excessively decreasing the productivity of the exhaust gas-purifying catalyst.

The third operation may be omitted. That is, the sequence including the first, second and fourth operations may be repeated.

In the case of omitting the third operation, it is possible to further provide the manufacturing apparatus 100 with a member for preventing the dripping of the fluid SL, for example, the liquid amount-adjusting mechanism described below.

The liquid amount-adjusting mechanism includes, for example, a liquid amount-adjusting member placed adjacent to the plate-like portion 130B of the nozzle 130 and a drive mechanism that moves the liquid amount-adjusting member relative to the plate-like portion 130B. The liquid amount-adjusting member is, for example, a plate provided with openings at positions corresponding to the discharge ports DP of the plate-like portion 130B. The liquid amount-adjusting member is place, for example, such that it overlaps the plate-like portion 130B.

The drive mechanism moves the liquid amount-adjusting member, for example, in a direction parallel with the main surface of the plate-like portion 130B. Alternatively the drive mechanism rotates the liquid amount-adjusting member about an axis perpendicular to the main surface of the plate-like portion 130B. It is possible that the drive mechanism can further move the liquid amount-adjusting member in a direction perpendicular to the main surface of the plate-like portion 130B. The drive mechanism includes, for example, an actuator such as a rotary actuator. For example, the drive mechanism includes a rotary actuator that rotates the liquid amount-adjusting member about an axis perpendicular to the main surface of the plate-like portion 130B.

The liquid amount-adjusting mechanism adjusts the positions of the openings of the liquid amount-adjusting member with respect to the discharge ports DP of the plate-like portion 130B to control the supply of the fluid SL to the substrate SB. For example, in the case of maximizing the amount of fluid SL supplied to the substrate SB, the liquid amount-adjusting member is rotated so as to completely align the positions of the openings of the liquid amount-adjusting member with respect to the positions of the discharge ports DP of the plate-shape portion 130B. In the case of reducing the amount of fluid SL supplied to the substrate SB, the liquid amount-adjusting member is rotated so as to slightly displace the positions of them. In the case of stopping the supply of the fluid SL to the substrate SB, the liquid amount-adjusting member is rotated so as to completely displace the positions of them.

When such operations are performed, the amount of the fluid SL supplied by the nozzle 130 can be controlled more precisely. Further, when such operations are performed, it is possible to prevent the dripping of the fluid SL from the nozzle over a period of time during which the supply of the fluid SL from the nozzle 130 to the substrate SB is suspended. Therefore, when such a structure is employed, it is possible to minimize the variation in the position of the front edge of the fluid layer due to the dripping.

The following structure may be applied to the above-described manufacturing apparatus 100.

Figure 8:
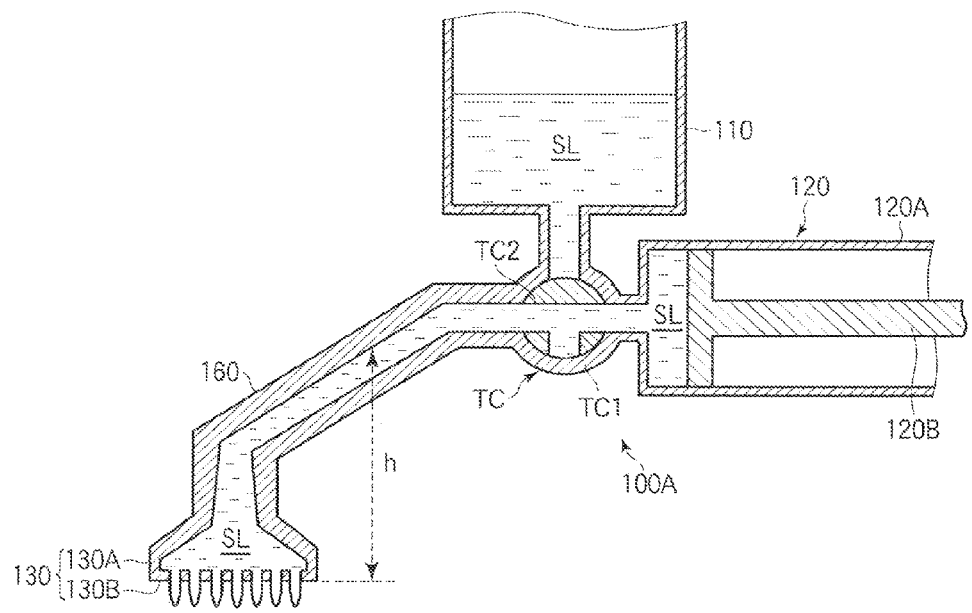
FIG. 8 is a sectional view schematically showing a modified example of the manufacturing apparatus shown in FIGS. 1 to 4.

FIG. 8 is a sectional view schematically showing a modified example of the manufacturing apparatus shown in FIGS. 1 to 4. Note that only the first portion 100A is depicted in FIG. 8. Note also that the second drive mechanism 400 and the controller 500 are omitted in FIG. 8.

The first portion 100A shown in FIG. 8 is the same as the first portion 100A shown in FIGS. 1 to 4 except that the conduit 160 and the nozzle 130 have different structures.

The conduit 160 shown in FIG. 8 has the following structure. Firstly, supposed are lines of intersection of different planes perpendicular to the flow direction of the fluid SL in the conduit 160 and the interior wall of the conduit 160. Next, supposed is a curve obtained by connecting points with one another in the flow direction of the fluid SL, each of the points is on the line of intersection and has the maximum height h from a plane perpendicular to a direction of gravity. The curve thus obtained has the height h monotonically decreasing from the position at which the conduit 160 and the third port are connected with each other to the position at which the nozzle 130 and the conduit 160 are connected with each other.

When such a structure is employed, it is possible in the start-up operation to discharge the air in the conduit 160 to the external space or to prevent the air from remaining in the conduit 160. Thus, this makes it possible to improve the efficiency of the start-up operation or to precisely control the amount of the fluid SL supplied to each substrate SB.

Various modifications can be made to the nozzle 130 of the above-describe manufacturing apparatus 100.

FIG. 9 is a plan view schematically showing a modified example of the nozzle. The nozzle 130 shown in FIG. 9 is the same as the nozzle 130 shown in FIG. 5 except that the plate-like portion is elliptical. When such a nozzle 130 is used, the fluid SL can be supplied to the end face EF1 of the substrate SB in a relatively uniform manner even in the case where the substrate SB is an elliptic cylinder.

Similarly, for example, in the case where the substrate SB is a quadrangular prism having a trapezoidal base, it is possible that the plate-like portion 130B is trapezoidal and the discharge ports are evenly arranged in the trapezoid. When such a structure is employed, the fluid SL can be supplied to the end face EF1 of the substrate SB in a relatively uniform manner even in the case where the substrate SB has the above-described shape.

In the case of changing the substrate SB to another whose end face EF1 has a different shape, it is possible to block one or more of the discharge ports DP such that the arrangement of the unblocked discharge ports DP has a shape corresponding to the shape of the end face EF1 of the substrate SB. When such a structure is employed, the fluid SL can be supplied to the end face EF1 of the substrate SB in a relatively uniform manner without replacing the nozzle 130 even in the case where the substrate SB is changed to the one whose end face EF1 has a different shape.

As described above, when the shape of the plate-like portion 130B and/or the arrangement of the discharge ports DP correspond to the shape of the end face EF1, the fluid SL can be supplied to the end face EF1 of the substrate SB in a relatively uniform manner regardless of the shape of the end face EF1.

The discharge ports DP may be arranged unevenly instead of arranging them evenly. This will be described below.

In the case of using the nozzle 130 in which the discharge ports DP are arranged evenly as shown in FIGS. 5 and 9, it is possible that the distance from the end face EF1 to the front edge of the fluid layer (hereinafter referred to as the length of the fluid layer) is greater in the holes extending from the center of the end face EF1 than in the holes extending from the periphery of the end face EF1. The reason is considered to be as follows. That is, the layer that the fluid SL forms on the end face EF1 is prone to be thicker at the center of the end face EF1 than at the periphery of the end face EF1.

FIG. 10 is a plan view schematically showing another modified example of the nozzle. FIG. 11 is a plan view schematically showing still another modified example of the nozzle.

In the nozzle 130 shown in FIG. 10, the discharge ports DP are not provided at the center of the plate-like portion 130B but provided mostly in the vicinity of the center of the plate-like portion 130B and the periphery of the plate-like portion 130B. In the nozzle 130 shown in FIG. 11, the discharge ports DP are not provided at the center of the plate-like portion 130B and in the vicinity thereof but provided at the periphery of the plate-like portion 130B and in the vicinity thereof.

That is, in the nozzles 130 shown in FIGS. 10 and 11, the discharge ports DP are arranged unevenly. In the case of employing such a structure, the variation in the position of the front edge of the fluid layer can be further reduced, in particular, when the discharge ports DP are arranged such that the density of the discharge ports DP is the highest at a position spaced apart from the center of the plate-like portion 130B.

In the case of arranging the discharge ports DP as described above, the discharge ports DP are typically arranged to satisfy the following conditions.

Firstly, first and second convex polygons are supposed. Here, "convex polygon" means a polygon in which all the interior angles are less than 180°. The first convex polygon surrounds all the discharge ports DP and has the smallest area. The second convex polygon has an area of 0.6 times the area of the first convex polygon. The second convex polygon is located inside the outline OL1 of the first convex polygon such that a distance from the second convex polygon to the outline OL1 of the first convex polygon is constant at all locations on the outline OL2 of the second convex polygon. That is, the first and second convex polygons are similar figures.

Supposing the first and second polygons for the discharge ports DP arranged unevenly, a ratio of a total area occupied by the discharge ports DP arranged between the outlines OL1 and OL2 with respect to a total area occupied by all the discharge ports DP is, for example, 0.1 or more, and typically falls within a range of 0.1 to 0.3. This ratio may be greater than 0.4. Note that in the nozzles 130 shown in FIGS. 10 and 11, the discharge ports DP are arranged to satisfy this condition.

In the case of employing such a structure, almost the same amount of the fluid SL can be supplied to the periphery of the end face EF1 of the substrate SB and the center of the end face EF1 of the substrate SB. Thus, in this case, the difference between the length of the fluid layer in the holes extending from the center of the end face EF1 and the length of the fluid layer in the holes extending from the periphery of the end face EF1 can be made smaller. Therefore, in this case, the variation in the position of the front edge of the fluid layer can be further reduced.

The following structure may be employed in the nozzle 130.

Figure 13:
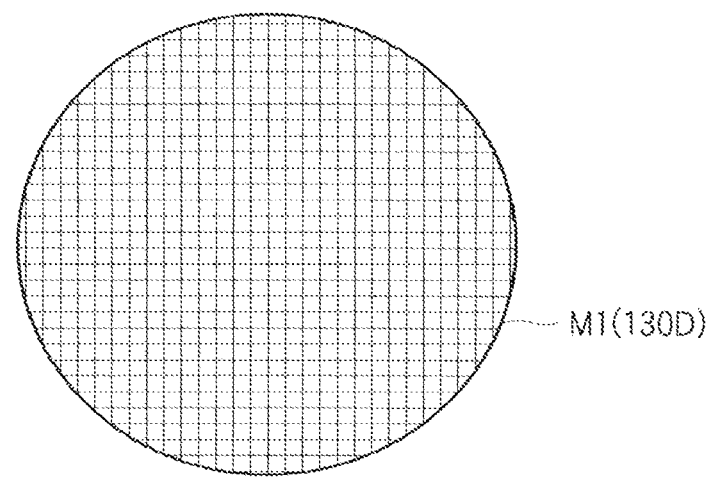
FIG. 13 is a plan view schematically showing the deflector included in the nozzle shown in FIG. 12.

FIG. 12 is a plan view schematically showing another modified example of the nozzle. FIG. 13 is a plan view schematically showing the deflector included in the nozzle shown in FIG. 12.

The nozzle 130 shown in FIG. 12 has the same structure as that of the nozzle 130 shown in FIG. 5 except that it further includes the deflector 130D placed inside the hollow portion 130A. FIGS. 12 and 13 depict a mesh M1 as an example of the deflector 130D.

The deflector 130D causes a change in the flow of the fluid SL in the nozzle 130. Specifically, the deflector 130D relatively decreases the amount of the fluid SL supplied to the center of the plate-like portion 130B and relatively increases the amount of the fluid SL supplied to the periphery of the plate-like portion 130B. That is, the deflector 130D reduces the difference between the amount of the fluid SL supplied to the center of the plate-like portion 130B and the amount of the fluid SL supplied to the periphery of the plate-like portion 130B. Thus, the deflector 130D makes the amount of the fluid SL discharged from the discharged ports DP of the nozzle 130 more even.

The deflector 130D shown in FIGS. 12 and 13 divides the internal space of the hollow portion 130A into a downstream region adjacent to the plate-like portion 130B and an upstream region interposed between the downstream region and the first opening of the hollow portion 130A. The deflector 130D is provided with through-holes connecting the upstream and downstream regions with each other. When employing such a structure, a shear force is exerted on the fluid SL when the fluid SL passes through the through-holes of the deflector 130D. Thus, it is possible to suppress the growth of the boundary layer formed near the interior wall of the hollow portion 130A and to reduce the difference between the amount of the fluid supplied to the center of the plate-like portion 130B and the amount of the fluid supplied to the periphery of the plate-like portion 130B. In addition, it is possible to prevent the viscosity of the fluid SL from increasing not only in the vicinity of the interior wall of the hollow portion 130A but also at a position space apart therefrom.

Figure 14:
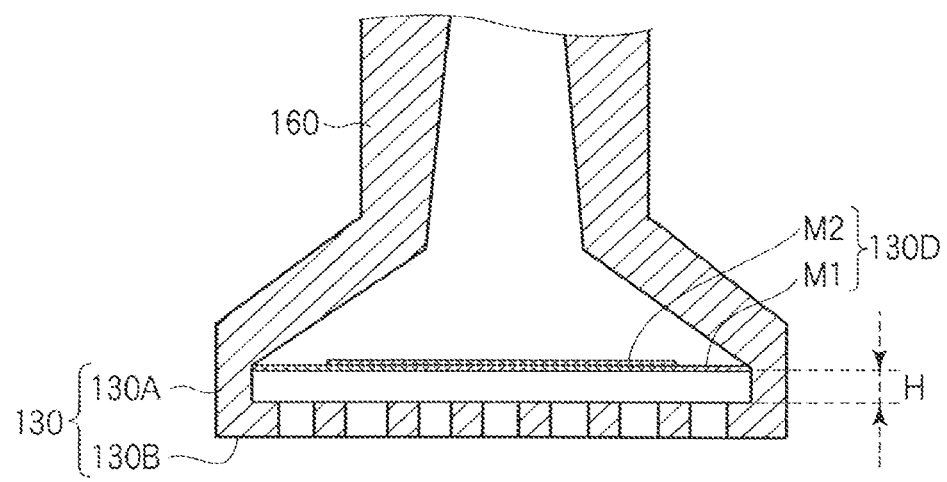
FIG. 14 is a sectional view schematically showing a modified example of the nozzle shown in FIG. 12.
Figure 15:
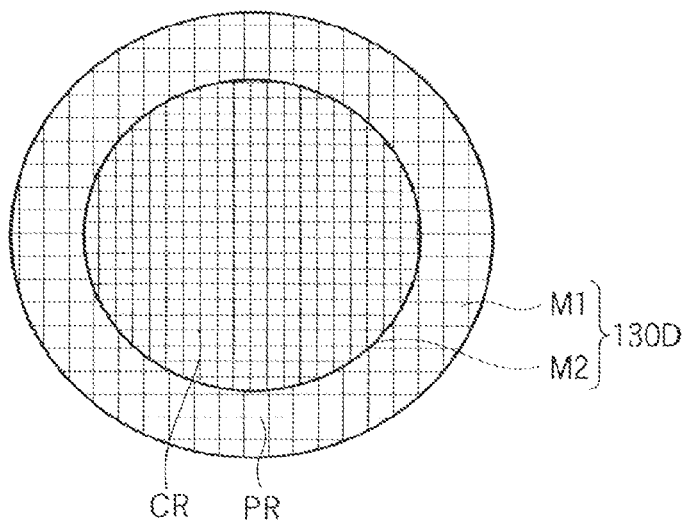
FIG. 15 is a plan view schematically showing the deflector included in the nozzle shown in FIG. 14.

FIG. 14 is a sectional view schematically showing a modified example of the nozzle shown in FIG. 12. FIG. 15 is a plan view schematically showing the deflector included in the nozzle shown in FIG. 14.

The nozzle 130 shown in FIG. 14 is the same as the nozzle described with reference to FIGS. 12 and 13 except that the deflector 130D has a different structure. FIGS. 14 and 15 depict a pair of meshes M1 and M2 stacked together and having different mesh sizes as another example of the deflector 130D.

The deflector 130D shown in FIGS. 14 and 15 divides the internal space of the hollow portion 130A into a downstream region adjacent to the plate-like portion 130B and an upstream region interposed between the downstream region and the first opening of the hollow portion 130A. The deflector 130D is provided with through-holes connecting the upstream and downstream regions with each other.

In addition, the deflector 130D shown in FIGS. 14 and 15 includes a center portion CR and a peripheral portion PR surrounding the center portion CR. The center portion PR is provided with some of the above-described through-holes as first through-holes. The peripheral portion PR is provided with the remainders of the above-described through-holes as second through-holes. A ratio of a total area occupied by the first through-holes with respect to an area of the center portion CR is smaller than a ratio of a total area occupied by the second through-holes with respect to an area of the peripheral portion PR. When employing such a structure, the difference between the amount of the fluid SL supplied to the center of the plate-like portion 130B and the amount of the fluid SL supplied to the periphery of the plate-like portion 130B can be reduced more effectively.

In the case of using the deflector 130D shown in FIGS. 14 and 15, for example, the following structure is employed in the deflector 130D. That is, the mesh M1 and the mesh M2 having a smaller diameter and a smaller mesh size as compared with the mesh M1 are stacked together such that their centers substantially coincide with each other. In this case, the mesh size of the mesh M1 is set within, for example, a range of 0.5 to 2 mm, and the mesh size of the mesh M2 is set within, for example, a range of 0.2 to 1.5 mm. In the case where the meshes M1 and M2 are circular, they are typically placed such that their centers coincide with each other. Also, in the case where the meshes M1 and M2 are circular, the diameter of the mesh M2 is set to be, for example, 0.2 to 0.7 times the diameter of the mesh M1.

In each of the nozzles 130 shown in FIGS. 12 and 14, the minimum distance H between the deflector 130D and the plate-like portion 130 is set within, for example, a range of 1 to 15 mm, typically a range of 1 to 5 mm. When the distance H is decreased excessively, it is possible that the flow of the fluid SL in the in-plane direction between the deflector 130D and the plate-like portion 130B is hindered. When the distance is increased excessively, the effect of the deflector 130D will decrease.

Although each of FIGS. 13 and 15 depicts one or more meshes as an example of the deflector 130D, it is possible that the deflector 130D is not a mesh. For example, the deflector 130D may be a perforated plate such as a punched plate. There is no limit to the material of the deflector 130D. The deflector 130 is made of, for example, metals, ceramics or plastics.

As described above, in the case of using the deflector 130D, the layer that the fluid SL forms on the end face EF1 can have a more uniform thickness. Therefore, when the deflector 130D is used, the positions of the front edges of the fluid layer can be made more uniform.

In the case of using a mesh as the deflector 130D, however, clogging is prone to occur. When the clogging occurs in the mesh, the flow of the fluid SL is hindered at the position of the clogging. In this case, there is a possibility that the layer of the fluid SL on the end face EF1 will have a nonuniform thickness, and thus, the positions of the front edges of the fluid layer will be nonuniform.

In addition, the nozzle 130 described with reference to FIGS. 14 and 15, the center portion of the nozzle 130D includes the mesh M2 having a smaller mesh size, and the peripheral portion of the deflector 130D includes the mesh M1 having a larger mesh size. The mesh M2 exerts a stronger shear force on the fluid as compared with the mesh M1. Thus, the fluid SL having passed through the peripheral portion of the deflector 130D has a kinematic viscosity higher than that of the fluid SL having passed through the center portion of the deflector 130D. For this reason, when the discharge of the fluid SL from the nozzle 130 is stopped, dripping of the fluid SL is prone to occur at the discharge ports DP provided at the periphery of the plate-like portion 130B as compared with the discharge ports DP provided at the center of the plate-like portion 130B. Therefore, in the case where the fluid SL is sucked back into the nozzle 130 in order to prevent dripping of the fluid SL from the nozzle 130, there is a possibility that the fluid SL cannot be sufficiently sucked back at the periphery of the plate-like portion 130B or the air comes into the nozzle 130 at the center of the plate-like portion 130B.

When the following structure is employed, the problems associated with the use of meshes can be averted, and the variation in the position of the front edge of the fluid layer can be further reduced.

Figure 16:
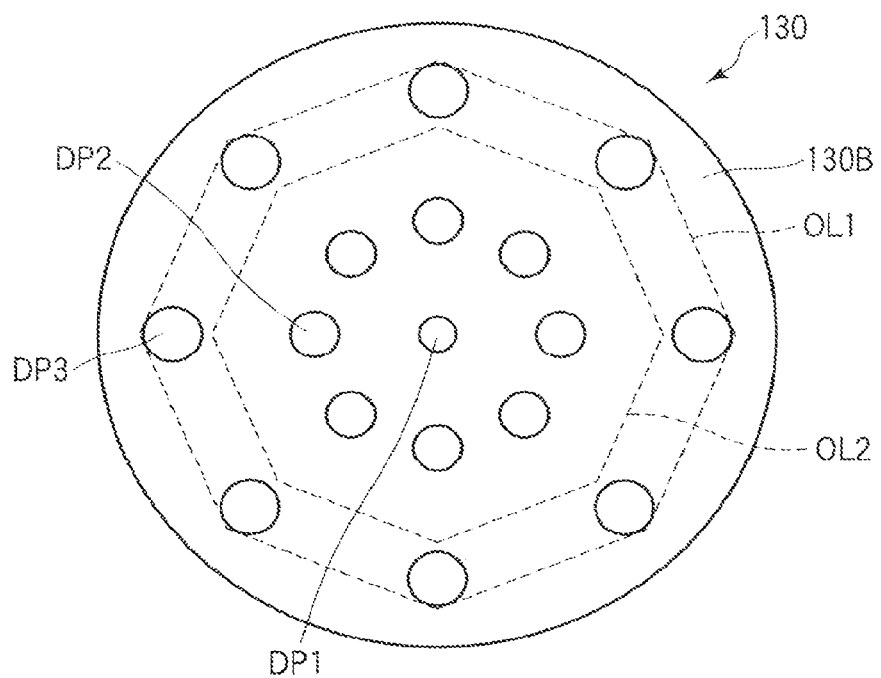
FIG. 16 is a plan view schematically showing another modified example of the nozzle.

FIG. 16 is a plan view schematically showing another modified example of the nozzle.

The nozzle 130 shown in FIG. 16 is the same as the nozzle 130 described with reference to FIGS. 1 to 5 except that the discharge ports DP1 to DP3 are provided as the discharge ports DP.

The discharge port DP1 has a diameter smaller than the diameters of the discharge ports DP2 and DP3. The discharge port DP1 discharges the fluid SL toward the center of the end face EF1 or its vicinity. Although a single discharge port DP1 is provided to the plate-like portion 130B in FIG. 16, a plurality of discharge ports DP1 may be provided to the plate-like portion 130B.

The discharge ports DP2 have a diameter greater than the diameter of the discharge port DP1 and smaller than the diameter of the discharge ports DP3. The discharge ports DP2 are arranged to surround the discharge port DP1.

The discharge ports DP3 have a diameter greater than the diameters of the discharge ports DP1 and DP2. The discharge ports DP3 are arranged to surround the discharge ports DP1 and DP2. The discharge ports DP3 discharge the fluid SL toward the periphery of the end face EF1.

In the case where this structure is employed in the nozzle 130, a greater amount of the fluid SL supplied to the center of the plate-like portion 130 moves toward the periphery of the plate-like portion 130B as compared with the case where the structure described with reference to FIGS. 1 to 5 is employed in the nozzle 130. That is, in the case of employing this structure, the difference between the amount of the fluid SL supplied to the center of the plate-like portion 130B and the amount of the fluid SL supplied to the periphery of the plate-like portion 130B can be reduced without using the deflector 130D. In other words, the variation in the position of the front edge of the fluid layer can be reduced.

Further, this nozzle 130 does not include the deflector 130D. Therefore, the problem associated with the use of meshes can be averted. That is, the nozzle 130 cannot cause clogging of a mesh. Moreover, in the case where the fluid SL is sucked back into the nozzle 130 in order to prevent the dripping of the fluid SL from the nozzle 130, the fluid SL can be sufficiently sucked back at the periphery of the plate-like portion 130B while preventing the air from coming into the nozzle 130 at the center of the plate-like portion 130B.

A ratio of a total area of the parts of the discharge ports DP1 to DP3 placed between the outlines OL1 and OL2, a total area occupied by the discharge ports DP3 herein with respect to a total area occupied by all the discharge ports DP1 to DP3 is, for example, 0.1 or more, and typically falls within a range of 0.1 to 0.3. This ratio may be greater than 0.4. In the case where this structure is employed, a greater amount of the fluid SL can be supplied to the periphery of the plate-like portion 130B as compared with the center of the plate-like portion 130. Thus, in this case, the difference between the length of the fluid layer in the holes extending from the center of the end face EF1 and the length of the fluid layer in the holes extending from the periphery of the end face EF1 can be further reduced. Therefore, in this case, the variation in the position of the front edge of the fluid layer can be further reduced.

Various modifications can be made to the nozzle 130 shown in FIG. 16.

For example, the discharge port DP1 may be omitted from the nozzle 130 described with reference to FIG. 16. Alternatively, the discharge ports DP2 or DP3 may be omitted. Further, the following structure may be employed in the nozzle 130.

Figure 17:
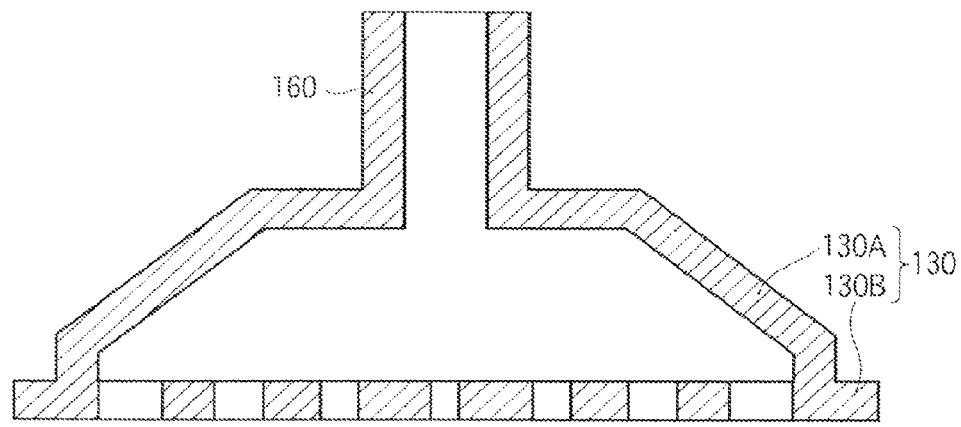
FIG. 17 is a sectional view schematically showing a modified example of the nozzle shown in FIG. 16.
Figure 18:
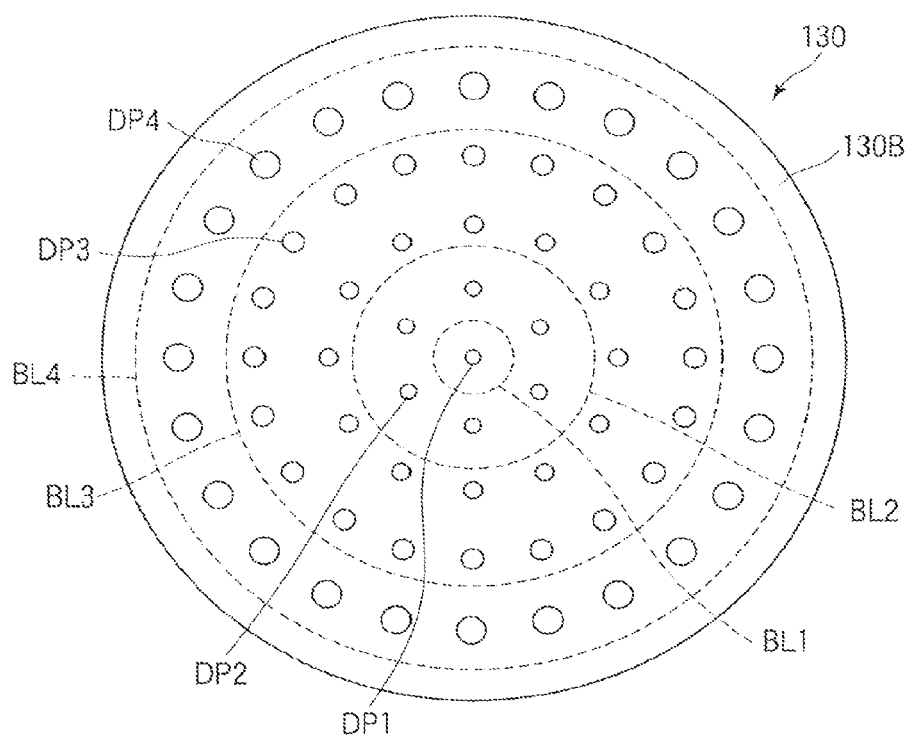
FIG. 18 is a plan view of the nozzle shown in FIG. 17.

FIG. 17 is a sectional view schematically showing a modified example of the nozzle shown in FIG. 16. FIG. 18 is a plan view of the nozzle shown in FIG. 17.

The nozzle 130 shown in FIGS. 17 and 18 is the same as the nozzle 130 described with reference to FIG. 16 except that the following structure is employed. That is, the plate-like portion 130 of the nozzle 130 is further provided with the discharge ports DP4 in addition to the discharge ports DP1 to DP3 as the discharge ports DP. The discharge ports DP1 to DP4 are arranged in the first to fourth regions, respectively.

The first region is the region of the plate-like portion 130B surrounded by the broken line BL1. The end face EF1 and the region surrounded by the broken line BL1 are, for example, similar figures. The maximum diameter of the region surrounded by the broken line BL1 is smaller than the maximum diameter of the end face EF1 by, for example, 140 mm. A plurality of discharge ports DP1 may be arranged in the region surrounded by the broken line BL1.

The second region is the region sandwiched between the broken lines BL1 and BL2. The region surrounded by the broken line BL1 and the region surrounded by the broken line BL2 are, for example, similar figures. In the case where the similar figures are the figures other than circle, the region surrounded by the broken line BL1 and the region surrounded by the broken line BL2 have the same orientation. The maximum diameter of the region surrounded by the broken line BL2 is smaller than the maximum diameter of the end face EF1 by, for example, 95 mm.

The third region is the region sandwiched between the broken lines BL2 and BL3. The region surrounded by the broken line BL1 and the region surrounded by the broken line BL3 are, for example, similar figures. In the case where the similar figures are the figures other than circle, the region surrounded by the broken line BL1 and the region surrounded by the broken line BL3 have the same orientation. The maximum diameter of the region surrounded by the broken line BL3 is smaller than the maximum diameter of the end face EF1 by, for example, 45 mm.

The fourth region is the region sandwiched between the broken lines BL3 and BL4. The region surrounded by the broken line BL1 and the region surrounded by the broken line BL4 are, for example, similar figures. In the case where the similar figures are the figures other than circle, the region surrounded by the broken line BL1 and the region surrounded by the broken line BL4 have the same orientation. The maximum diameter of the region surrounded by the broken line BL4 is, for example, the same as the maximum diameter of the end face EF1.

The discharge port DP1 is provided in the region of the plate-like portion 130B surrounded by the broken line BL1. Here, only one discharge port DP1 is provided at the center of the region of the plate-like portion 130B surrounded by the broken line BL1.

A plurality of discharge ports DP1 may be provided to the region of the plate-like portion 130B surrounded by the broken line BL1. In this case, the discharge ports DP1 may be arranged in a pattern of a circle or concentric circles. In the latter case, the discharge ports DP1 may have the same diameter between the circular arrangements of the discharge ports DP1. Alternatively, the discharge ports DP1 may have a greater diameter in the outer circular arrangements of the discharge ports DP1 than that in the inner circular arrangements of the discharge ports DP1.

The diameter of the discharge port DP1 is smaller than the diameter of the discharge ports DP4. For example, the diameter of the discharge port DP1 is smaller than the diameters of the discharge ports DP2 to DP4. Alternatively, the diameter of the discharge port DP1 is the same as the diameter of the discharge ports DP2, equal to or less than the diameter of the discharge ports DP3, and less than the diameter of the discharge ports DP4. A ratio of the diameter of the discharge port DP1 with respect to the diameter of the discharge ports DP4 falls within, for example, a range of 0.4 to 0.5. A ratio of an area occupied by the discharge port DP1 with respect to a total area occupied by the discharge ports DP1 to DP4 falls within, for example, a range of 1:20.0 to 1:120.0.

The discharge ports DP2 are provided to the region sandwiched the broken lines BL1 and BL2. Here, the discharge ports DP2 are arranged in a circular pattern. The center of the circular pattern of the arrangement of the discharge ports DP2 is located at the center of the region surrounded by the broken line BL1. The diameter of the discharge ports DP2 is smaller than the diameter of the discharge ports DP4. For example, the diameter of the discharge ports DP2 is smaller than the diameter of the discharge ports DP3 and DP4. Alternatively, the diameter of the discharge ports DP2 is equal to the diameter of the discharge ports DP3 and smaller than the diameter of the discharge ports DP4. A ratio of the diameter of the discharge ports DP2 with respect to the diameter of the discharge ports DP4 falls within, for example, a range of 0.5 to 0.6. A ratio of a total area occupied by the discharge ports DP2 with respect to a total area occupied by the discharge ports DP1 to DP4 falls within, for example, a range of 1:3.0 to 1:40.0.

The discharge ports DP2 may be arranged in a pattern of concentric circles. In this case, the discharge ports DP2 may have the same diameter between the circular arrangements of the discharge ports DP2. Alternatively, the discharge ports DP2 may have a greater diameter in the outer circular arrangements of the discharge ports DP2 than that in the inner circular arrangements of the discharge ports DP2.

The discharge ports DP3 are provided to the region sandwiched between the broken lines BL2 and BL3. Here, the discharge ports DP3 are arranged in a pattern of concentric circles. The centers of the concentric circular patterns of the arrangement of the discharge ports DP2 are located at the center of the region surrounded by the broken line BL1. The diameter of the discharge ports DP3 is smaller than the diameter of the discharge ports DP4. A ratio of the diameter of the discharge ports DP3 with respect to the diameter of the discharge ports DP4 falls within, for example, a range of 0.6 to 0.7. A ratio of a total area occupied by the discharge ports DP3 with respect to a total area occupied by the discharge ports DP1 to DP4 falls within, for example, a range of 1:1.3 to 1:8.0. The discharge ports DP3 may be arranged in a circular pattern.

The discharge ports DP4 are provided to the region sandwiched between the broken lines BL3 and BL4. Here, the discharge ports DP4 are arranged in a circular pattern. The center of the circular pattern of the arrangement of the discharge ports DP4 is located at the center of the region surrounded by the broken line BL1. The diameter of the discharge ports DP4 falls within, for example, a range of 2 to 7 mm. A ratio of a total area occupied by the discharge ports DP4 with respect to a total area occupied by the discharge ports DP1 to DP4 falls within, for example, a range of 1:1.3 to 1:1.7.

The discharge ports DP4 may be arranged in a pattern of concentric circles. In this case, the discharge ports DP4 may have the same diameter between the circular arrangements of the discharge ports DP4. Alternatively, the discharge ports DP4 may have a greater diameter in the outer circular arrangements of the discharge ports DP4 than that in the inner circular arrangements of the discharge ports DP4.

The nozzles 130 described with reference to FIGS. 16 to 18 do not include the deflector 130D. These nozzles 130 may further include the deflector 130D.

The plate-like portions 130B of the nozzles 130 described with reference to FIGS. 16 to 18 are circular. The plate-like portions 130B of the nozzles 130 may have other shapes.

Figure 19:
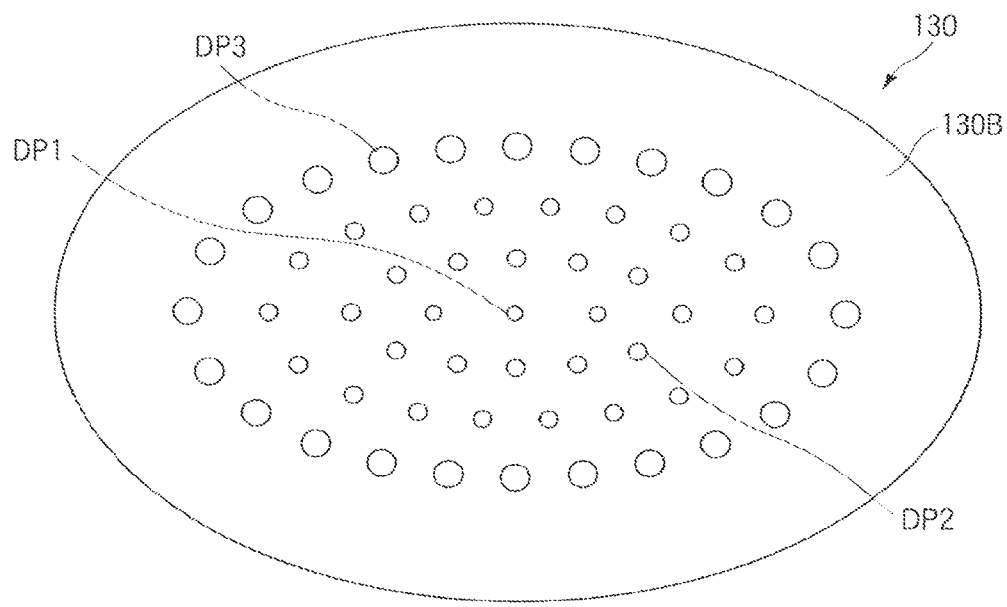
FIG. 19 is a sectional view schematically showing another modified example of the nozzle shown in FIG. 16.

FIG. 19 is a sectional view schematically showing another modified example of the nozzle shown in FIG. 16.

The plate-like portion 130B of the nozzle 130 shown in FIG. 19 is elliptical. When such a nozzle 130 is used, the fluid SL can be supplied to the end face EF1 of the substrate SB in a relatively uniform manner even in the case where the substrate SB is an elliptic cylinder. As above, the plate-like portion 130B can have various shapes.

It is unnecessary that the shape of the plate-like portion 130B corresponds to the shape of the arrangement of the discharge ports. For example, in the case where the end face EF1 of the substrate SB is elliptical, it is unnecessary that the plate-like portion 130B is elliptical as long as the arrangement of the discharge port is elliptical.

In all the nozzles 130 described above, the edges of the discharge ports may be beveled. The shape of the lower edges of the discharge ports DP, however, may have influence on clogging of the discharge ports DP.

Figure 20:
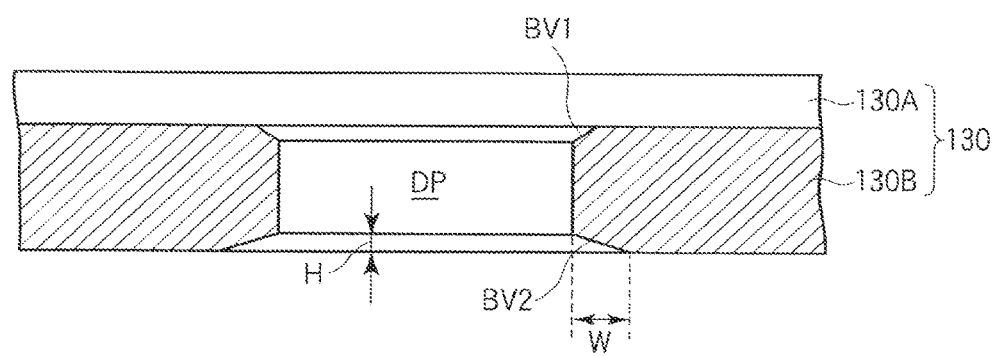
FIG. 20 is a sectional view schematically showing an example of a structure that can be employed in the discharge port.
Figure 21:
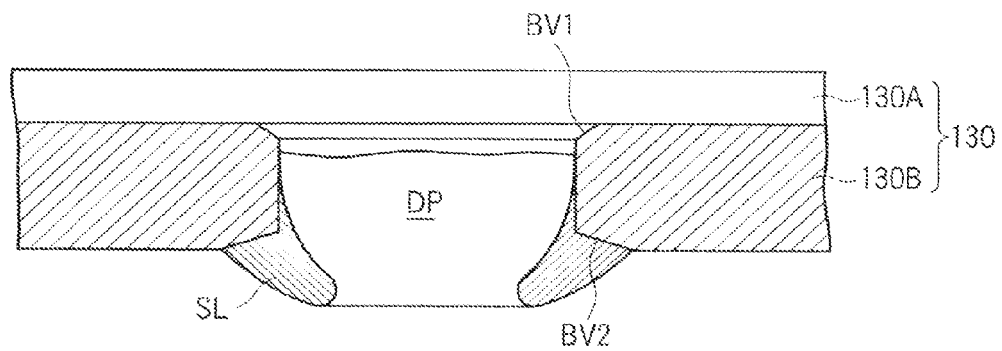
FIG. 21 is a sectional view schematically showing an example of a blockage in the discharge port that can occur in the case of employing the structure shown in FIG. 20.
Figure 22:
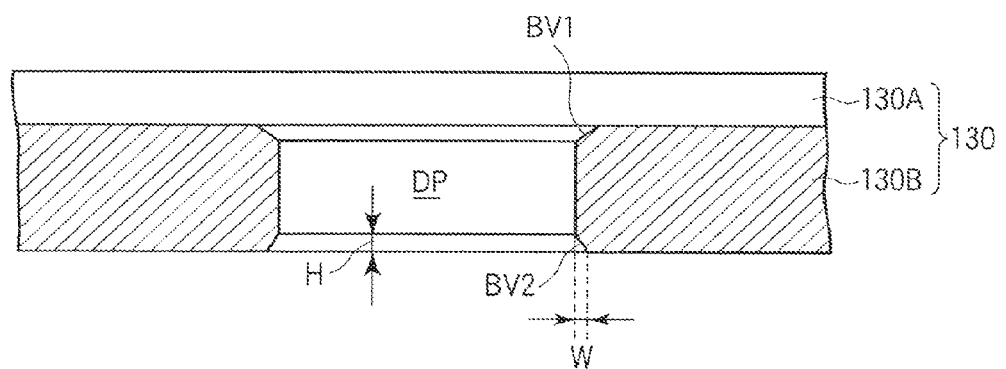
FIG. 22 is a sectional view schematically showing another example of a structure that can be employed in the discharge port.

FIG. 20 is a sectional view schematically showing an example of a structure that can be employed in the discharge port. FIG. 21 is a sectional view schematically showing an example of a blockage in the discharge port that can occur in the case of employing the structure shown in FIG. 20. FIG. 22 is a sectional view schematically showing another example of a structure that can be employed in the discharge port.

In FIGS. 20 and 22, both the upper and lower edges of the discharge ports DP are beveled. That is, each 5 discharge port DP is provided with the beveled portion BV1 and BV2 at the edge adjacent to the internal space of the nozzle and the edge adjacent to the external space outside the nozzle, respectively. In the case of providing both the beveled portion BV1 and BV2, the 10 possibility that a burr hinders the flow of the fluid SL is low as compared with the case of providing either one of the beveled portions BV1 and BV2.

In the case of employing the structure shown in FIG. 20, however, a relatively large amount of slurry SL exists on the beveled portion BV2 in a period during which the fluid SL is not supplied. Thus, when the nozzle 130 employing the structure shown in FIG. 20 is used repeatedly, there is a possibility that a solid body SL' originated from the slurry SL grows at the lower edge of the discharge port DP. When such a growth of the solid body SL' occurs, it is possible that the effective diameter of the discharge port D decreases and eventually it clogs the discharge port DP.

The growth of the solid body SL' can be suppressed by decreasing the width W of the beveled portion BV2, in particular, by decreasing a ratio/H of the width W with respect to a height H of the beveled portion BV2. Here, the width W is defined as follows. Supposed is an orthogonal projection of the beveled portion BV2 onto a plane parallel with the lower surface of the plate-like portion 130B. The width W is the minimum distance between the inner contour of the orthogonal projection and the outer contour of the orthogonal projection. The height H is the height of the beveled portion BV2 with respect to a plane including the lower surface of the plate-like portion 130B.

The width W is set within, for example, a range of 0 to 0.1 mm, typically, 0.03 to 0.1 mm. The ratio W/H is set within, for example, a range of 0.5 to 2, typically 0.8 to 1. In the case where the width W or the ratio W/H is large, the growth of the solid body SL' is prone to occur. Further, in normal cases, forming the beveled portions BV2 with a small width W or ratio W/H cannot sufficiently removed burrs. Therefore, the width W and the ratio W/H are preferably minimized within a range that the burrs can be removed sufficiently.

Although, depicted in FIGS. 5, 9 to 11, 18 and 19 are discharge ports DP having circular openings, the openings of the discharge ports DP may have other shapes. For example, the openings of the discharge ports DP may be elliptical.

The minimum distance between the discharge ports DP is typically set within a range of 5 to 20 mm. When the distance is excessively small, there is a possibility that the flows of the fluid SL discharged from adjacent discharged ports DP come in contact with each other just after discharged from the discharge ports DP in the case where the supply rate, solid content and viscosity of the fluid SL fall within specific ranges. In this case, evenly supplying the fluid SL may be difficult. Further, when the distance is excessively long, the fluid SL forms a layer on the end face EF1 to have a nonuniform thickness.

A total area of the regions of the lower surface of the plate-like portion 130B occupied by the discharge ports DP is set, for example, at 180 mm$^2$ or more. When the total area is excessively small, the flow speed of the fluid SL is excessively high. In this case, there is a tendency that a larger amount of the fluid SL is supplied to the holes positioned in front of the discharge ports DP as compared to the other holes. This total area is set, for example, 2,000 mm$^2$ or less. When the total area is excessively large, there is a possibility that the internal space of the nozzle 130 cannot be almost completely filled with the fluid and thus the amount of the discharged fluid SL varies among the discharge ports DP.

The average diameter of the discharge ports DP is typically set greater than the average diameter of the holes formed in the substrate SB. In this case, most of the flows of the fluid SL having passed the discharge ports of the nozzle 130 come in contact with the partition walls at the inlets of the holes of the substrate SB. When the flows of the fluid SL come in contact with the partition walls, the flows are dispersed in directions parallel with the end face EF1 and thus the speed in the length direction of the holes decreases. For this reason, the variation in the position of the front edge of the fluid layer can be suppressed easily. The average diameter of the discharge ports DP is set within, for example, a range of 2 to 7 mm.

The discharge ports DP are provided, for example, such that the first polygon has an area smaller than the area of the end face EF1 of the substrate SB. Typically, the discharge ports DP are provided such that the first polygon is positioned inside the outline of the end face EF1 when the above-described first polygon is superposed on the outline of the end face EF1. When such a structure is employed, the adhesion of the fluid SL onto the guide member 150 and the leakage of the fluid SL from the fluid reservoir formed by the guide member 150 and the substrate SB become less prone to occur.

In the case where the plate-like portion 130B of the nozzle 130 and the end face EF1 of the substrate SB are circular, the difference between the diameter of the plate-shaped portion 130B and the diameter of the end face EF1 is set, for example, 5 mm or less. This makes it possible to minimize the adhesion of the fluid SL onto the guide member 150.

In the above-described process, the fluid SL is supplied to the end face EF1 and a fluid, typically gas, in the holes of the substrate SB is sucked down from the end face EF2 of the substrate SB. Subsequent to this first process, the following second process may be performed.

After completing the formation of the fluid layer on the partition walls of the substrate SB, the guide member 150 is removed from the substrate SB and the substrate SB is removed from the support 140. Then, the fluid layer formed in the first process is dried as needed, and thereafter the substrate SB is turned upside down. Subsequently, it is transferred into a manufacturing apparatus having the same structure as that of the above-described apparatus 100 except that the tank 110 contains a different fluid SL. Then, a second fluid layer is formed on the partition walls of the substrate SB by the same method as that described above except that the fluid is supplied onto the end face EF2 of the substrate SB.

Thereafter, the fluid layer is dried as needed and then fired. Thus, obtained is an exhaust gas-purifying catalyst in which catalytic layers having different compositions are formed in the upstream and downstream regions of the substrate SUB.

Examples of the present invention will be described below.

EXAMPLE 1

(Preparatory Test 1)
Prepared was slurry having a solid content of 35% by mass, a viscosity of 200 mPa·s at a shear rate of 200 s$^{-1}$, and a viscosity of 8,000 mPa·s at a shear rate of 0.4 s$^{-1}$. Hereinafter, the slurry is referred to as "slurry S1".

The manufacturing apparatus described with reference to FIGS. 1 to 4 was prepared. Here, a structure similar to that described with reference to FIG. 9 was employed in the nozzle 130. Specifically, the shape of the plate-like portion 130B of the nozzle 130 used herein was an ellipse having a major axis of 175 mm length and a minor axis of 120 mm length. This plate-like portion 130B was provided with 53 discharge ports DP arranged in a pattern of concentric circles. Each of the discharge ports DP had a shape of circle with a diameter of 5 mm, and the minimum distance between the discharge ports DP was 5 mm.

Then, the connection of the first to third ports was set to the first state without mounting a monolith substrate SB on the manufacturing apparatus 100 so as to transfer 300 g of slurry S1 from the tank 110 into the syringe 120. Subsequently, the connection was switched from the first state to the second state so as to supply the slurry S1 in the syringe 120 to the nozzle 130. At this moment, a mass of the slurry S1 discharged was measured for each of the discharge ports DP.

The above-described operation was repeated, and an average mass of discharged slurry S1 was calculated for each of the discharge ports DP. Then, a difference between the maximum value and the minimum value of the average values was obtained as "variation in the amount of discharge". The result is summarized in TABLE 1 below.

(Main Test 1)

A monolith substrate SB was mounted on the manufacturing apparatus 100 used in the preparatory test 1. Here, the monolith substrate SB used herein was an elliptic cylinder. The end face EF1 of the substrate SB had a major axis of 147 mm length and a minor axis of 97 mm length. The substrate SB was mounted such that the major axis of the end face EF1 was parallel with the long direction of the plate-like portion 130B of the nozzle 130.

Next, the connection of the first to third ports was set to the first state, and 200 g of slurry S1 was transferred from the tank 110 into the syringe 120. Then, the connection was switched from the first state to the second state so as to supply the slurry S1 in the syringe 120 to the nozzle 130. Subsequently, the piston 120B was pulled back to a distance equivalent to 1 mL of slurry S1 while maintaining the connection in the second state. Then, the above-described suction treatment was performed on the end face EF2 of the substrate SB. Thus, the substrate SB was coated with the slurry S1.

The above operation was performed on 10 substrates SB. Then, the following evaluation was performed.

That is, the variation in the position of the front edge of the fluid layer was obtained. Specifically, a difference between the maximum value and the minimum value of the length of the fluid layer was obtained for each of the substrates SB coated with the slurry S1. The average value of the differences was calculated as "variation in the position of the front edge of the fluid layer".

Further, dripping of the slurry SL from the discharge ports DP in the period during which supply of the slurry S1 suspended was visually checked.

The results are summarized in TABLE 1 below.

EXAMPLE 2

200 g of slurry S1 was supplied to a monolith substrate SB by the method described with reference to FIG. 6. Here, used was the same monolith substrate SB as that used in Example 1. Then, the leveling treatment described with reference to FIG. 7 was performed. Thereafter, performed was the same suction treatment as that performed in Example 1. Then, performed was the same evaluation as that performed in Example 1. The results are summarized in TABLE 1 below.

TABLE 1

| Example | Variation in the amount of discharge (g) | Variation in the position of the front edge of the fluid layer (mm) | Dripping of the fluid |
|---------|------------------------------------------|---------------------------------------------------------------------|----------------------|
| 1 | 3.7 | 10.6 | None |
| 2 | — | 20.8 | None |

As shown in TABLE 1, in the case of employing the method according to Example 1, the variation in the position of the front edge of the fluid layer was reduced as compared with the case of employing the method according to Example 2.

EXAMPLE 3

(Preparatory Test 2)

Prepared was a manufacturing apparatus 100 that is the same as that used in Example 1 except that the structure shown in FIG. 23 was employed in the nozzle 130. Specifically, the plate-like portion 130B of the nozzle 130 used herein had a shape of circle with a diameter of 113 mm. This plate-like portion 130B was provided with 37 discharge ports DP arranged in a pattern of concentric circles. Each of the discharge ports DP had a shape of circle with a diameter of 5 mm. The discharge ports DP were arranged evenly, and the minimum distance therebetween was 5 mm.

Then, the connection of the first to third ports was set to the first state so as to transfer 300 g of slurry S1 from the tank 110 into the syringe 120.

Subsequently, the connection was switched from the first state to the second state so as to supply the slurry S1 in the syringe 120 to the nozzle 130. At this moment, a mass of the slurry S1 discharged was measured for each of the discharge ports DP1, DP2R, DP2L, DP3R, DP3L, DP4R and DP4L shown in FIG. 23. FIG. 24 shows the result.

(Main Test 2)

A circular cylinder-shaped monolith substrate SB whose end face EF1 had a diameter of 103 mm was mounted on the manufacturing apparatus used in the preparatory test 2. Next, the connection of the first to third ports was set to the first state, and 200 g of slurry S1 was transferred from the tank 110 into the syringe 120. Then, the connection was switched from the first state to the second state so as to supply the slurry S1 in the syringe 120 to the nozzle 130. Subsequently, the piston 120B was pulled back to a distance equivalent to 1 mL of slurry S1 while maintaining the connection in the second state. Then, the above-described suction treatment was performed on the end face EF2 of the substrate SB. Thus, the substrate SB was coated with the slurry S1.

The above operation was performed on 10 substrates SB. Then, performed was the same evaluation as that performed in main test 1. The results are summarized in TABLE 2 below.

EXAMPLE 4

Prepared was a manufacturing apparatus 100 that is the same as that used in Example 3 except that the deflector 130D shown in FIG. 13 was placed in the hollow portion 130A of the nozzle 130. The deflector 130D used herein was a circular mesh M1 having a diameter of 113 mm and a mesh size of 0.8 mm. The mesh M1 was placed to face the plate-like portion 130B such that the distance H therebetween was 3 mm.

The same evaluation as that performed in Preparatory test 2 and Main test 2 was performed except that the above manufacturing apparatus 100 was used. The results are summarized in TABLE 2 below.

EXAMPLE 5

Prepared was a manufacturing apparatus 100 that is the same as that used in Example 3 except that the deflector 130D shown in FIG. 15 was placed in the hollow portion 130A of the nozzle 130. The deflector 130D used herein was a pair of meshes M1 and M2 stacked together. The mesh M1 was circular and had a diameter of 113 mm. The mesh size of the mesh M1 was 1.2 mm. The mesh M2 was circular and had a diameter of 85 mm. The mesh size of the mesh M2 was 0.8 mm. The meshes M1 and M2 were stacked together such that their centers coincided with each other. The deflector 130 including the meshes M1 and M2 was placed to face the plate-like portion 130B such that the distance H therebetween was 3 mm.

The same evaluation as that performed in Preparatory test 2 and Main test 2 was performed except that the above manufacturing apparatus 100 was used. The results are summarized in FIG. 25 and TABLE 2 below.

TABLE 2

| Example | Variation in the amount of discharge (g) | Variation in the position of the front edge of the fluid layer (mm) | Dripping of the fluid |
|---|---|---|---|
| 3 | 3.8 | 10.9 | None |
| 4 | 2.2 | 6.4 | None |
| 5 | 1.1 | 3.7 | None |

Comparing the data for Example 2 shown in TABLE 1 and the data for Examples 3 to 5 shown in TABLE 2, the variation in the amount of discharge and the variation in the position of the front edge of the fluid layer are smaller in Examples 3 to 5 than those in Example 2. That is, using the nozzle 130 having a plurality of discharge ports made it possible to reduce the variation in the amount of discharge and the variation in the position of the front edge of the fluid layer.

Figure 25:
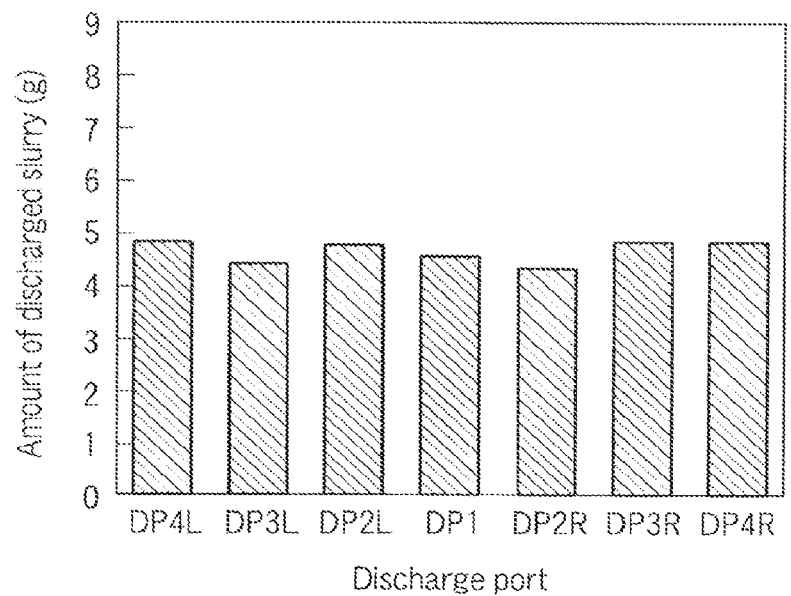
FIG. 25 is a bar graph showing another example of a relationship between the position of the discharge port and the amount of the discharged slurry.

Comparing the data for Examples 3 to 5 shown in TABLE 2 or the data shown in FIGS. 24 and 25, the variation in the amounts of the fluid SL discharged from the discharge ports of the nozzle 130 is smaller in Examples 4 and 5 than that in Example 3. That is, placing the deflector 130D in the hollow portion 130A of the nozzle 130 could make the amounts of the fluid SL discharged from the discharge ports of the nozzle 130 more uniform.

EXAMPLE 6

Prepared was a manufacturing apparatus 100 that is the same as that used in Example 3 except that the following structure was employed in the nozzle 130. Specifically, the plate-like portion 130B of the nozzle 130 used herein had a shape of circle with a diameter of 113 mm. This plate-like portion 130B was provided with 37 discharge ports DP arranged in a pattern of concentric circles. Each of the discharge ports DP had a shape of circle with a diameter of 5 mm. The discharge ports DP were arranged evenly, and the minimum distance therebetween was 8 mm.

Then, prepared was slurry having a solid content of 20% by mass, a viscosity of 200 mPa·s at a shear rate of 200 $s^{-1}$, and a viscosity of 8,000 mPa·s at a shear rate of 0.4 $s^{-1}$. Hereinafter, the slurry is referred to as "slurry S2".

Then, mounted on the above manufacturing apparatus 100 was a circular cylinder-shaped monolith substrate SB whose end face EF1 had a diameter of 103 mm. Next, the connection of the first to third ports was set to the first state, and 200 g of slurry S2 was transferred from the tank 110 into the syringe 120. Then, the connection was switched from the first state to the second state so as to supply the slurry S2 in the syringe 120 to the nozzle 130. Subsequently, the piston 120B was pulled back to a distance equivalent to 1 mL of slurry S2 while maintaining the connection in the second state. Then, the above-described suction treatment was performed on the end face EF2 of the substrate SB. Thereafter, performed was the same evaluation as that performed in Main test 1.

As a result, no dripping of the slurry S2 from the discharge ports occurred over a period of time during which the supply of the fluid SL from the nozzle 130 to the substrate SB was suspended. The variation in the position of the front edge of the fluid layer was 4 mm or less.

EXAMPLE 7

Prepared was a manufacturing apparatus 100 that is the same as that used in Example 6 except that the structure shown in FIG. 10 was employed in the nozzle 130 instead of the structure shown in FIG. 5. Specifically, the plate-like portion 130B of the nozzle 130 used herein had a shape of circle with a diameter of 113 mm. This plate-like portion 130B was provided with 12 discharge ports DP arranged in a pattern of concentric circles. Each of the discharge ports DP had a shape of circle with a diameter of 5 mm. 8 discharge ports DP were arranged at regular intervals such that the distance between the center of each discharge port and the center of the plate-like portion 130B was 39 mm. 4 discharge ports were arranged at regular intervals such that the distance between the center of each discharge port and the center of the plate-like portion 130B was 19.5 mm.

Then, performed was the same evaluation as that performed in Example 6 except that the above manufacturing apparatus 100 was used. As a result, no dripping of the slurry S2 from the discharge ports occurred over a period of time during which the supply of the fluid SL from the nozzle 130 to the substrate SB was suspended. The variation in the position of the front edge of the fluid layer was 4 mm or less.

EXAMPLE 8

Prepared was a manufacturing apparatus 100 that is the same as that used in Example 1 except that the following structure was employed in the nozzle 130. Specifically, the plate-like portion 130B of the nozzle 130 used herein had a shape of ellipse having a major axis of 175 mm length and a minor axis of 120 mm length. This plate-like portion 130B was provided with 57 discharge ports DP arranged in a pattern of concentric circles. Each of the discharge ports DP had a shape of circle with a diameter of 5 mm. The discharge ports DP were arranged evenly, and the minimum distance therebetween was 5 mm.

Then, prepared was slurry having a solid content of 35% by mass, a viscosity of 200 mPa·s at a shear rate of 200 $s^{-1}$, and a viscosity of 8,000 mPa·s at a shear rate of 0.4 s$^{-1}$. Hereinafter, the slurry is referred to as "slurry S3".

Then, a monolith substrate SB was mounted on the above manufacturing apparatus 100. The monolith substrate SB used herein had a shape of elliptic cylinder. The end face EF1 of the substrate SB had a major axis of 147 mm length and a minor axis of 95 mm length. The substrate SB was mounted such that the major axis of the end face EF1 was parallel with the long direction of the plate-like portion 130B of the nozzle 130.

Next, the connection of the first to third ports was set to the first state, and 400 g of slurry S3 was transferred from the tank 110 into the syringe 120. Then, the connection was switched from the first state to the second state so as to supply the slurry S3 in the syringe 120 to the nozzle 130. Subsequently, the piston 120B was pulled back to a distance equivalent to 1 mL of slurry S3 while maintaining the connection in the second state. Then, the above-described suction treatment was performed on the end face EF2 of the substrate SB. Thereafter, performed was the same evaluation as that performed in Main test 1.

As a result, no dripping of the slurry S3 from the discharge ports occurred over a period of time during which the supply of the slurry S3 was suspended. The variation in the position of the front edge of the fluid layer was 4 mm or less.

EXAMPLE 9

200 g of slurry S2 was supplied to a monolith substrate SB by the method described with reference to FIG. 6. Here, used was the same monolith substrate SB as that used in Example 6. Then, the leveling treatment described with reference to FIG. 7 was performed. Thereafter, performed was the same suction treatment as that performed in Example 6. Then, performed was the same evaluation as that performed in Main test 1. As a result, the difference between the maximum value and the minimum value of the distance from the end face EF1 of the substrate SB to the edge of the fluid layer was 22.0 mm.

EXAMPLE 10

(Preparatory Test 3)

Figure 26:
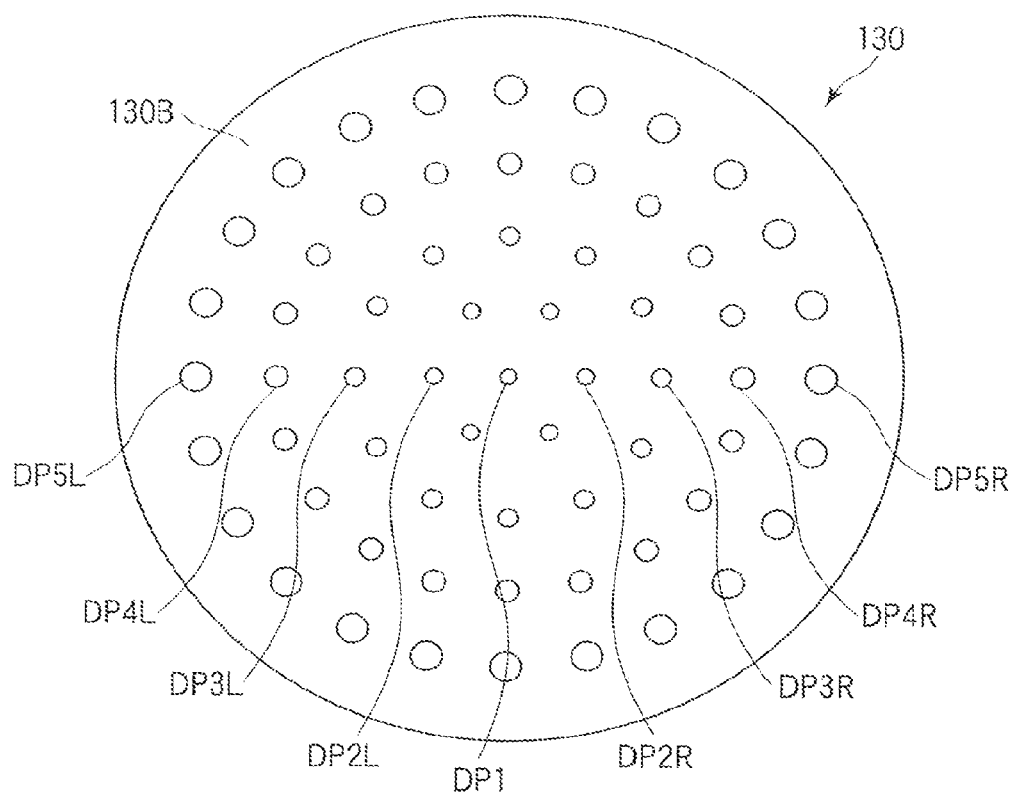
FIG. 26 is a plan view schematically showing the nozzle used in Example 10.

Prepared was a manufacturing apparatus 100 that is the same as that used in Example 1 except that the structure shown in FIG. 26 was employed in the nozzle 130. Specifically, the plate-like portion 130B of the nozzle 130 used herein had a shape of circle with a diameter of 170 mm. This plate-like portion 130B was provided with 61 discharge ports DP each having a circular shape and arranged in a pattern of concentric circles.

To be more specific, a discharge port having a diameter of 2.9 mm was provided at the center of the plate-like portion 130B. 6 discharge ports each having a diameter of 2.9 mm were arranged at regular intervals at positions spaced apart from the center by 13 mm such that the discharge ports formed a circular arrangement. 12 discharge ports each having a diameter of 3.4 mm were arranged at regular intervals at positions spaced apart from the center by 26 mm such that the discharge ports formed a circular arrangement. 18 discharge ports each having a diameter of 3.4 mm were arranged at regular intervals at positions spaced apart from the center by 39 mm such that the discharge ports formed a circular arrangement. 24 discharge ports each having a diameter of 5 mm were arranged at regular intervals at positions spaced apart from the center by 52 mm such that the discharge ports formed a circular arrangement.

Then, prepared was slurry having a solid content of 35% by mass, a viscosity of 3,000 mPa·s at a shear rate of 0.4 s$^{-1}$, and a viscosity of 300 mPa·s at a shear rate of 200 s$^{-1}$. Hereinafter, the slurry is referred to as "slurry S4".

Then, the connection of the first to third ports was set to the first state so as to transfer 200 g of slurry S4 from the tank 110 into the syringe 120.

Figure 27:
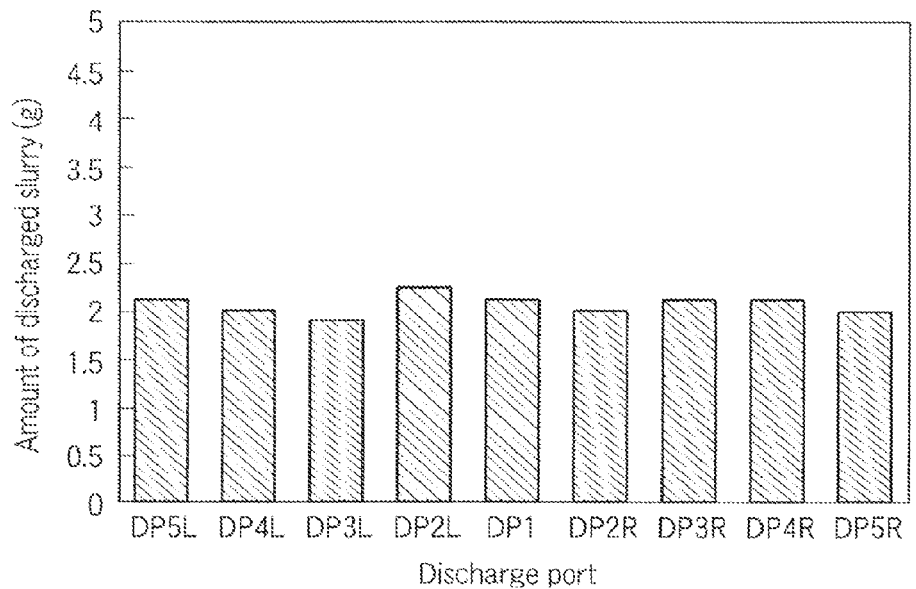
FIG. 27 is a bar graph showing another example of a relationship between the position of the discharge port and the amount of the discharged slurry.

Subsequently, the connection was switched from the first state to the second state so as to supply the slurry S4 in the syringe 120 to the nozzle 130. At this moment, a mass of the slurry S4 discharged was measured for each of the discharge ports DP1, DP2R, DP2L, DP3R, DP3L, DP4R, DP4L, DP5R and DP5L shown in FIG. 26. FIG. 27 shows the result.

(Main Test 3)

A circular cylinder-shaped monolith substrate SB whose end face EF1 had a diameter of 129 mm was mounted on the manufacturing apparatus used in Preparatory test 3. Next, the connection of the first to third ports was set to the first state, and 200 g of slurry S4 was transferred from the tank 110 into the syringe 120. Then, the connection was switched from the first state to the second state so as to supply the slurry S4 in the syringe 120 to the nozzle 130. Subsequently, the piston 120B was pulled back to a distance equivalent to 1 mL of slurry S4 while maintaining the connection in the second state. Then, the above-described suction treatment was performed on the end face EF2 of the substrate SB. Thus, the substrate SB was coated with the slurry S4.

The above operation was performed on 10 substrates SB. Then, performed was the same evaluation as that performed in Main test 1. The results are summarized in TABLE 3 below.

EXAMPLE 11

Figure 28:
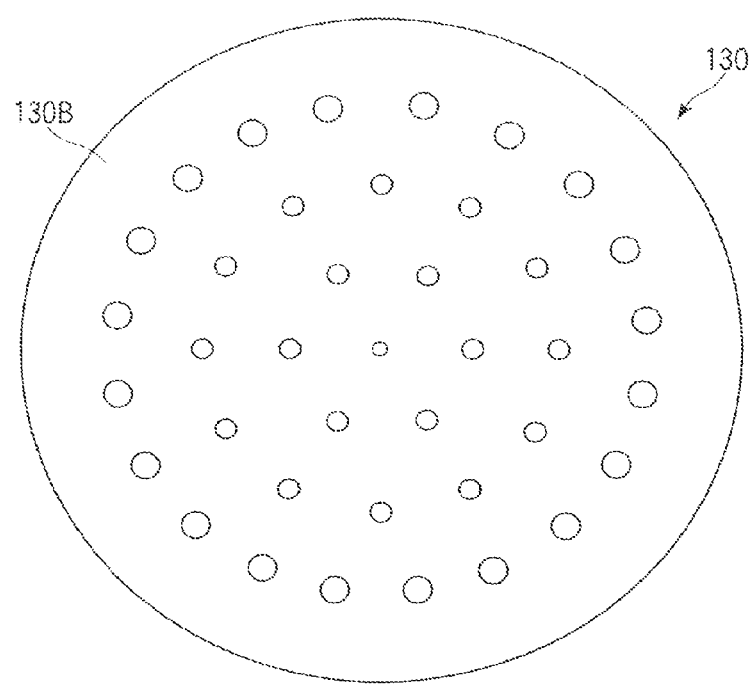
FIG. 28 is a plan view schematically showing the nozzle used in Example 11.

Prepared was a manufacturing apparatus 100 that is the same as that used in Example 10 except that the structure shown in FIG. 28 was employed in the nozzle 130. Specifically, the plate-like portion 130B of the nozzle 130 used herein had a shape of circle with a diameter of 150 mm. This plate-like portion 130B was provided with 37 discharge ports DP each having a circular shape and arranged in a pattern of concentric circles.

To be more specific, a discharge port having a diameter of 2.9 mm was provided at the center of the plate-like portion 130B. 6 discharge ports each having a diameter of 3.4 mm were arranged at regular intervals at positions spaced apart from the center by 13 mm such that the discharge ports formed a circular arrangement. 12 discharge ports each having a diameter of 3.4 mm were arranged at regular intervals at positions spaced apart from the center by 26 mm such that the discharge ports formed a circular arrangement. 18 discharge ports each having a diameter of 5 mm were arranged at regular intervals at positions spaced apart from the center by 39 mm such that the discharge ports formed a circular arrangement.

The same evaluation as that performed in Example 10 was performed except that the above manufacturing apparatus 100 was used. The results are summarized in TABLE 3 below.

EXAMPLE 12

Prepared was a manufacturing apparatus 100 that is the same as that used in Example 10 except that the same structure as used in Example 1 was employed in the nozzle 130. The same evaluation as that performed in Example 10 was performed except that the above manufacturing apparatus 100 was used. The results are summarized in TABLE 3 below.

TABLE 3

| Example | Variation in the amount of discharge (g) | 5σ (g) | Variation in the position of the front edge of the fluid layer (mm) | Dripping of the fluid |
|---|---|---|---|---|
| 10 | 0.4 | 0.7 | 3.8 | None |
| 11 | 0.4 | 0.7 | 3.8 | None |
| 12 | 0.5 | 3.5 | 3.7 | Yes |

Comparing the data for Example 2 shown in TABLE 1 and the data for Examples 10 to 12 shown in TABLE 3, the variation in the amount of discharge and the variation in the position of the front edge of the fluid layer are smaller in Examples 10 to 12 than those in Example 2. That is, using the nozzle 130 having a plurality of discharge ports made it possible to reduce the variation in the amount of discharge and the variation in the position of the front edge of the fluid layer.

Comparing the data for Examples 10 to 12 shown in TABLE 3, the variations in the amounts of discharge between the discharge ports DP achieved in Examples 10 to 12 were almost equal to one another. Similarly, the variations in the position of the front edge of the fluid layer achieved in Examples 10 to 12 were almost equal to one another.

However, no dripping of the slurry occurred in Examples 10 and 11, while dripping of the slurry occurred in Example 12. Further, the variation in the amount of the supplied slurry was smaller in Examples 10 and 11 than that in Example 12. This result reveals that the structure including no mesh is advantageous in the case of using slurry whose viscosity greatly reduces when applying a shear force.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An apparatus of manufacturing an exhaust gas-purifying catalyst, comprising:
a support supporting a substrate, the substrate having first and second end faces and being provided with holes each extending from the first end face toward the second end face;
a nozzle configured to discharge a fluid containing a raw material of a catalytic layer to the substrate, the nozzle being provided with discharge ports each discharging the fluid toward the first end face of the substrate; and
a first suction device configured to suck gas present in the holes of the substrate from the second end face of the substrate,
wherein the discharge ports have greater diameters at a periphery of an arrangement of the discharge ports than at a center of the arrangement of the discharge ports,
wherein a ratio in diameter of the discharge ports that are arranged at the center of the arrangement with respect to the diameter of the discharge ports that are arranged at the periphery of the arrangement is 0.7 or less.

2. The apparatus of manufacturing an exhaust gas-purifying catalyst according to claim 1, further comprising:
a fluid supply device including a tank storing the fluid and an outlet discharging the fluid to be supplied to the nozzle; and
a conduit including first and second end portions, the first end portion being connected with the outlet and supplied with the fluid from the fluid supply device, the second end portion being connected with the nozzle and supplying the fluid to the nozzle,
wherein when supposing a curve obtained by connecting points with one another in a flow direction of the fluid in the conduit, each of the points being on a line of intersection of a plane perpendicular to the flow direction and an interior wall of the conduit and having a maximum height from a plane perpendicular to a direction of gravity, the height monotonically decreases from a position at which the conduit and the outlet are connected with each other to a position at which the conduit and the nozzle are connected with each other.

3. The apparatus of manufacturing an exhaust gas-purifying catalyst according to claim 1, further comprising a second suction device sucking back the fluid hanging down from or positioned in the discharge ports.

4. The apparatus of manufacturing an exhaust gas-purifying catalyst according to claim 1, further comprising:
a fluid supply device performing a supply operation of supplying a certain amount of the fluid to the nozzle and a suction operation of sucking back a part of the fluid in the nozzle; and
a controller controlling operation of the fluid supply device such that the supply operation is repeated during a continuous production and the suction operation is performed when suspending the continuous production.

5. The apparatus of manufacturing an exhaust gas-purifying catalyst according to claims 4,
wherein the fluid supply device comprises:
a tank storing the fluid;
a syringe including a cylinder and a piston linearly movable in the cylinder;
a drive mechanism causing the piston to linearly move in and relative to the cylinder;
a first port communicated with the tank;
a second port communicated with the cylinder;
a third port communicated with the nozzle; and
a switch mechanism switching connection of the first to third ports between a first state in which the first and second ports are connected with each other and the third port is disconnected from the first and second ports and a second state in which the second and third ports are connected with each other and the first port is disconnected from the second and third ports, and
wherein the controller controls operation of the switch and drive mechanisms such that first and second operations are alternately performed during the continuous production and that a third operation is performed when the continuous production is suspended, the first operation including setting the connection of the first to third ports into the first state and causing the piston to linearly move relative to the cylinder such that a front end of the piston moves away from a bottom of the cylinder so as to extract a part of the fluid from the tank into the syringe, the second operation including setting the connection of the first to third ports into the second state and causing the piston to linearly move with respect to the cylinder such that the front end of the piston moves closer to the bottom of the cylinder so as to supply a certain amount of the fluid to the nozzle, the third operation including setting the connection of the first to third ports into the second state and causing the piston to linearly move relative to the cylinder such that the front end of the piston moves away from the bottom of the cylinder so as to suck back the fluid hanging down from or positioned in the discharge ports.

6. The apparatus of manufacturing an exhaust gas-purifying catalyst according to claim 1, further comprising:
 a fluid supply device performing a supply operation of supplying a certain amount of the fluid to the nozzle and a suction operation of sucking back the fluid hanging down from or positioned in the discharge ports; and
 a controller controlling operation of the fluid supply device such that the supply operation and the suction operation are repeated alternately.

7. The apparatus of manufacturing an exhaust gas-purifying catalyst according to claim 6,
 wherein the fluid supply device comprises:
 a tank storing the fluid;
 a syringe including a cylinder and a piston linearly movable in the cylinder;
 a drive mechanism causing the piston to linearly move in and relative to the cylinder;
 a first port communicated with the tank;
 a second port communicated with the cylinder;
 a third port communicated with the nozzle; and
 a switch mechanism switching connection of the first to third ports between a first state in which the first and second ports are connected with each other and the third port is disconnected from the first and second ports and a second state in which the second and third ports are connected with each other and the first port is disconnected from the second and third ports, and
 wherein the controller controls operation of the switch and drive mechanisms such that first to third operations are repeated in this order, the first operation including setting the connection of the first to third ports into the first state and causing the piston to linearly move relative to the cylinder such that a front end of the piston moves away from a bottom of the cylinder so as to extract a part of the fluid from the tank into the syringe, the second operation including setting the connection of the first to third ports into the second state and causing the piston to linearly move with respect to the cylinder such that the front end of the piston moves closer to the bottom of the cylinder so as to supply a certain amount of the fluid to the nozzle, the third operation including setting the connection of the first to third ports into the second state and causing the piston to linearly move relative to the cylinder such that the front end of the piston moves away from the bottom of the cylinder so as to suck back the fluid hanging down from or positioned in the discharge ports.

8. The apparatus of manufacturing an exhaust gas-purifying catalyst according to claim 1, further comprising an installation mechanism configured to place a frame-shaped guide member before the nozzle discharges the fluid toward the first end face of the substrate such that the guide member surrounds a region adjacent to the substrate at a position of the first end face to form a receiving pan that receives the fluid.

9. The apparatus of manufacturing an exhaust gas-purifying catalyst according to claim 1, wherein the discharge ports are arranged to form concentric patterns.

10. The apparatus of manufacturing an exhaust gas-purifying catalyst according to claim 1, wherein each edge of the discharge ports that is adjacent to a space outside the nozzle is beveled to form a beveled portion having a width of 0.5 mm or less.

11. The apparatus of manufacturing an exhaust gas-purifying catalyst according to claim 1, wherein the nozzle further comprises:
 a hollow portion defining an internal space therein and provided with first and second openings connecting the internal space and an external space outside the hollow portion with each other, the hollow portion being configured such that the fluid is supplied to the internal space through the first opening;
 a plate-like portion covering the second opening and provided with the discharge ports; and
 a deflector located in the hollow body.

12. The apparatus of manufacturing an exhaust gas-purifying catalyst according to claim 11, wherein the deflector divides the internal space into a downstream region adjacent to the plate-like portion and an upstream region interposed between the downstream region and the first opening, the deflector being provided with through-holes connecting the upstream and downstream regions with each other.

13. The apparatus of manufacturing an exhaust gas-purifying catalyst according to claim 12, wherein the deflector includes a center portion provided with first through-holes as some of the through-holes and a peripheral portion surrounding the center portion and provided with second through-holes as the remainders of the through-holes, a ratio of a total area occupied by the first through-holes with respect to an area of the center portion being smaller than a ratio of a total area occupied by the second through-holes with respect to an area of the peripheral portion.

14. The apparatus of manufacturing an exhaust gas-purifying catalyst according to claim 1, wherein a minimum distance between the discharge ports is 5 mm or more.

* * * * *